United States Patent
Qin et al.

(10) Patent No.: US 10,904,063 B2
(45) Date of Patent: Jan. 26, 2021

(54) DOWNLINK SIGNAL SENDING METHOD, DOWNLINK SIGNAL RECEIVING METHOD, TRANSMIT END DEVICE, AND RECEIVE END DEVICE

(71) Applicant: HUAWEI TECHNOLOGIES CO., LTD., Guangdong (CN)

(72) Inventors: Yi Qin, Stockholm (SE); Zhongfeng Li, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/270,647

(22) Filed: Feb. 8, 2019

(65) Prior Publication Data

US 2019/0173719 A1 Jun. 6, 2019

Related U.S. Application Data

(63) Continuation of application No. PCT/CN2017/087738, filed on Jun. 9, 2017.

(30) Foreign Application Priority Data

Aug. 11, 2016 (CN) .......................... 2016 1 0658788

(51) Int. Cl.
  *H04L 27/26* (2006.01)
  *H04L 5/00* (2006.01)
  *H04J 11/00* (2006.01)
(52) U.S. Cl.
  CPC ...... *H04L 27/2666* (2013.01); *H04J 11/0069* (2013.01); *H04L 5/0048* (2013.01); *H04L 27/26* (2013.01); *H04L 27/2676* (2013.01)
(58) Field of Classification Search
  None
  See application file for complete search history.

(56) References Cited

U.S. PATENT DOCUMENTS

2013/0039331 A1* 2/2013 Koorapaty ............. H04L 5/001
  370/330
2014/0334478 A1* 11/2014 Cheng ................... H04L 27/261
  370/350

(Continued)

FOREIGN PATENT DOCUMENTS

CN    101076002 A    11/2007
CN    101895982 A    11/2010

(Continued)

OTHER PUBLICATIONS

Office Action issued in Chinese Application No. 201610658788.4 dated Aug. 22, 2019, 12 pages.
R1-133440—Pantech, "Discussion on PRBs containing PSS/SSS," 3GPP TSG RAN1 #74, Barcelona, Spain, Oct. 19-Oct. 23, 2013, 5 pages.

(Continued)

*Primary Examiner* — Diane L Lo
(74) *Attorney, Agent, or Firm* — Fish & Richardson P.C.

(57) ABSTRACT

The present disclosure includes example downlink signal sending methods, downlink signal receiving methods, and devices. In one example method a transmit end device indicates position information of at least one of a first signal or a second signal in time domain based on a position relationship between the first signal and the second signal in at least one of frequency domain or time domain. The transmit end device can then send a frame including the first signal and the second signal. In embodiments of the present invention, position information of a synchronization signal in time domain can be indicated, and sending of a single-symbol synchronization signal is also supported.

4 Claims, 14 Drawing Sheets

(56) References Cited

U.S. PATENT DOCUMENTS

| | | | | |
|---|---|---|---|---|
| 2015/0304932 | A1* | 10/2015 | Wei | H04J 11/0069 370/331 |
| 2016/0007269 | A1* | 1/2016 | Chae | H04L 5/0082 370/330 |
| 2016/0013879 | A1 | 1/2016 | Webb et al. | |
| 2016/0073366 | A1 | 3/2016 | Ng et al. | |
| 2016/0157194 | A1 | 6/2016 | Svedman et al. | |
| 2016/0337998 | A1* | 11/2016 | Kim | H04W 56/0005 |
| 2019/0208481 | A1* | 7/2019 | Tang | H04W 56/001 |

FOREIGN PATENT DOCUMENTS

| | | |
|---|---|---|
| CN | 102761957 A | 10/2012 |
| CN | 104349464 A | 2/2015 |
| CN | 104620647 B | 5/2015 |
| GB | 2512126 A | 9/2014 |
| JP | 2016077295 A | 5/2016 |
| JP | 2016519874 A | 7/2016 |
| WO | 2009049167 A2 | 4/2009 |
| WO | 2013081293 A1 | 6/2013 |
| WO | 2015080646 A1 | 6/2015 |
| WO | 2017175500 A1 | 10/2017 |

OTHER PUBLICATIONS

Extended European Search Report issued in European Application No. 17838425.1 dated Jun. 21, 2019, 9 pages.

R1-154405—NTT Docomo, Inc., "Discussion on DRS design for LAA," 3GPP TSG RAN WG1 Meeting #82, Beijing, China, Aug. 24-28, 2015, XP051001708, 4 pages.

PCT International Search Report and Written Opinion issued in International Application No. PCT/CN2017/087738 dated Aug. 16, 2017, 17 pages (with English translation).

Huawei, HiSilicon, "NR Primary and Secondary Synchronization Signals Design," 3GPP TSG RAN WG1 Meeting #87, R1-1611261, Reno, USA, Nov. 14-18, 2016, 11 pages.

Office Action issued in Japanese Application No. 2019-507142 dated Mar. 2, 2020, 15 pages (with English translation).

Office Action issued in Japanese Application No. 2019-507142 dated Aug. 31, 2020, 5 pages (with English translation).

MediaTek Inc., "LAA reservation signal design," 3GPP TSG RAN WG1 Meeting #81, R1-153255, Fukuoka, Japan, May 25-29, 2015, 4 pages.

Office Action issued in Korean Application 2019-7005935 dated Nov. 13, 2020, 7 pages (with English translation).

* cited by examiner

DOWNLINK SIGNAL SENDING METHOD, DOWNLINK SIGNAL RECEIVING METHOD, TRANSMIT END DEVICE, AND RECEIVE END DEVICE

CROSS-REFERENCE TO RELATED APPLICATIONS

This application is a continuation of International Application No. PCT/CN2017/087738, filed on Jun. 9, 2017, which claims priority to Chinese Patent Application No. 201610658788.4, filed on Aug. 11, 2016, The disclosures of the aforementioned applications are hereby incorporated by reference in their entireties.

TECHNICAL FIELD

The present invention relates to the communications field, and in particular, to downlink signal sending and reception in a wireless communications system.

BACKGROUND

As mobile Internet technologies are booming and 4G technologies are widely applied, a larger communication capacity is required. Existing frequency band resources already cannot satisfy a communication capacity requirement. Therefore, high-frequency communication becomes an important research direction of a future communications technology such as a 5G technology.

In a wireless communications system, and in particular, in a high-frequency communications system, to ensure wide coverage of radio signals, a beamforming technology needs to be used. In high-frequency communication, a relatively large quantity of antennas are generally used to perform beamforming operations to achieve wider coverage. Beamforming includes analog beamforming and digital beamforming. Costs of analog beamforming are lower than costs of digital beamforming.

One of differences between the analog beamforming technology and the digital beamforming technology is that only one beam can be formed at one time by using the analog beamforming technology. Therefore, to transmit information in different directions, in the analog beamforming technology, the information needs to be sent at different times by using different beams, and consequently, synchronization signals must be sent on different beams in a sweeping mode at different times. In comparison with an omnidirectional mode of sending synchronization signals in an existing Long Term Evolution (Long Term Evolution, LTE) system, the analog beamforming technology can achieve wider coverage, but a quantity of times of sending increases significantly. In the analog beamforming technology, a plurality of beams may be sent in one subframe, or beams may be sent in a plurality of subframes in a frame. Regardless of whether a plurality of beams are sent in one subframe or beams are sent in a plurality of subframes in a frame, a symbol sequence number of a synchronization signal currently detected in a subframe cannot be obtained, and position information of the synchronization signal such as a subframe number, a frame number, a beam ID (beam identifier), and a beam group ID (beam group identifier) cannot be obtained either.

In an existing communications system, for example, in the LTE system, only one synchronization signal exists in each subframe, and a symbol in which the synchronization signal is located is fixed. Therefore, a sequence number of the symbol in which the synchronization signal is located does not need to be indicated. In addition, in the existing LTE system, two synchronization signals exist in each subframe, including a secondary synchronization signal (Secondary synchronization signal, SSS for short in English) and a primary synchronization signal (Primary synchronization signal, PSS for short in English). The primary synchronization signal PSS and the secondary synchronization signal SSS are sent in a time division manner in time domain. Therefore, the PSS and the SSS occupy at least two symbols.

It can be learned that, in the existing communications system such as the existing LTE system or an evolved LTE system, if a plurality of synchronization signals are sent in one subframe, sequence numbers of symbols in which the synchronization signals are located cannot be distinguished; if synchronization signals are sent in a plurality of subframes in a frame, subframe numbers cannot be distinguished. In addition, in the communications system such as the existing LTE system or the evolved LTE system, different synchronization signals such as the PSS and the SSS occupy at least two symbols. Therefore, the existing communications system does not support sending of a single-symbol synchronization signal. Consequently, a beam sweeping speed is limited.

SUMMARY

Embodiments of the present invention provide a downlink signal sending method, a downlink signal receiving method, a transmit end device, and a receive end device to indicate position information of a signal in time domain and a subcarrier spacing of a channel.

According to a first aspect, an embodiment of the present invention provides a downlink signal sending method, where the method includes:

indicating, by a transmit end device, position information of a first signal and/or a second signal in time domain based on a position relationship between the first signal and the second signal in frequency domain and/or time domain; and sending a frame including the first signal and the second signal.

In an example, the position relationship between the first signal and the second signal in frequency domain and/or time domain is specifically:

a relative position relationship between the first signal and the second signal in frequency domain and/or time domain.

In an example, the indicating, by a transmit end device, position information of a first signal and/or a second signal in time domain based on a position relationship between the first signal and the second signal in frequency domain and/or time domain includes:

indicating, by the transmit end device, the position information of the first signal and/or the second signal in time domain based on a frequency difference or a subcarrier sequence number difference between a subcarrier occupied by the second signal and a corresponding subcarrier occupied by the first signal.

In an example, the indicating, by a transmit end device, position information of a first signal and/or a second signal in time domain based on a position relationship between the first signal and the second signal in frequency domain and/or time domain includes:

indicating, by the transmit end device, the position information of the first signal and/or the second signal in time domain based on a time difference or a symbol sequence number difference between a symbol occupied by the second signal and a symbol occupied by the first signal.

In an example, the indicating, by a transmit end device, position information of a first signal and/or a second signal in time domain based on a position relationship between the first signal and the second signal in frequency domain and/or time domain includes:

indicating, by the transmit end device, the position information of the first signal and/or the second signal in time domain based on a frequency difference or a resource block sequence number difference between a resource block occupied by the second signal and a corresponding resource block occupied by the first signal.

In an example, the indicating, by a transmit end device, position information of a first signal and/or a second signal in time domain based on a position relationship between the first signal and the second signal in frequency domain and/or time domain includes:

indicating, by the transmit end device, the position information of the first signal and/or the second signal in time domain based on a time difference or a resource block sequence number difference between a resource block occupied by the second signal and a corresponding resource block occupied by the first signal.

In an example, the position information of the first signal and/or the second signal in time domain is specifically:

one or more of a symbol sequence number, a subframe number, a frame number, a beam number, and a beam group number of the first signal and/or the second signal.

According to a second aspect, an embodiment of the present invention provides a downlink signal receiving method, where the method includes:

receiving, by a receive end device, a frame including a first signal and a second signal;

obtaining a position relationship between the first signal and the second signal in frequency domain and/or time domain; and determining position information of the first signal and/or the second signal in time domain based on the position relationship between the first signal and the second signal in frequency domain and/or time domain.

In an example, the obtaining a position relationship between the first signal and the second signal in frequency domain and/or time domain is specifically:

obtaining a relative position relationship between the first signal and the second signal in frequency domain and/or time domain.

In an example, the determining position information of the first signal and/or the second signal in time domain based on the position relationship between the first signal and the second signal in frequency domain and/or time domain includes:

determining, by the receive end device, the position information of the first signal and/or the second signal in time domain based on a frequency difference or a subcarrier sequence number difference between a subcarrier occupied by the second signal and a subcarrier occupied by the first signal.

In an example, the determining position information of the first signal and/or the second signal in time domain based on the position relationship between the first signal and the second signal in frequency domain and/or time domain includes:

determining, by the receive end device, the position information of the first signal and/or the second signal in time domain based on a time difference or a symbol sequence number difference between a symbol occupied by the second signal and a symbol occupied by the first signal.

In an example, the determining position information of the first signal and/or the second signal in time domain based on the position relationship between the first signal and the second signal in frequency domain and/or time domain includes:

indicating, by the receive end device, the position information of the first signal and/or the second signal in time domain based on a frequency difference or a resource block sequence number difference between a resource block occupied by the second signal and a corresponding resource block occupied by the first signal.

In an example, the determining position information of the first signal and/or the second signal in time domain based on the position relationship between the first signal and the second signal in frequency domain and/or time domain includes:

determining, by the receive end device, the position information of the first signal and/or the second signal in time domain based on a time difference or a resource block sequence number difference between a resource block occupied by the second signal and a corresponding resource block occupied by the first signal.

In an example, the position information of the first signal and/or the second signal in time domain is specifically:

one or more of a symbol sequence number, a subframe number, a frame number, a beam number, and a beam group number of the first signal and/or the second signal.

According to a third aspect, an embodiment of the present invention provides a downlink signal sending method, where the method includes:

indicating, by a transmit end device, a subcarrier spacing of a channel based on a position relationship between a first signal and a second signal in frequency domain and/or time domain; and sending a frame including the first signal, the second signal, and the channel, where the channel includes a broadcast channel and/or a shared channel and/or a control channel.

In an example, the position relationship between the first signal and the second signal in frequency domain and/or time domain is specifically:

a relative position relationship between the first signal and the second signal in frequency domain and/or time domain.

In an example, the indicating, by a transmit end device, a subcarrier spacing of a channel based on a position relationship between a first signal and a second signal in frequency domain and/or time domain includes:

indicating, by the transmit end device, the subcarrier spacing of the channel based on a frequency difference or a subcarrier sequence number difference between a subcarrier occupied by the second signal and a corresponding subcarrier occupied by the first signal.

In an example, the indicating, by a transmit end device, a subcarrier spacing of a channel based on a position relationship between a first signal and a second signal in frequency domain and/or time domain includes:

indicating, by the transmit end device, the subcarrier spacing of the channel based on a time difference or a symbol sequence number difference between a symbol occupied by the second signal and a symbol occupied by the first signal.

In an example, the indicating, by a transmit end device, a subcarrier spacing of a channel based on a position relationship between a first signal and a second signal in frequency domain and/or time domain includes:

indicating, by the transmit end device, the subcarrier spacing of the channel based on a frequency difference or a resource block sequence number difference between a resource block occupied by the second signal and a corresponding resource block occupied by the first signal.

In an example, the indicating, by a transmit end device, a subcarrier spacing of a channel based on a position relationship between a first signal and a second signal in frequency domain and/or time domain includes:

indicating, by the transmit end device, the subcarrier spacing of the channel based on a time difference or a resource block sequence number difference between a resource block occupied by the second signal and a corresponding resource block occupied by the first signal.

According to a fourth aspect, an embodiment of the present invention provides a downlink signal receiving method, where the method includes:

receiving, by a receive end device, a frame including a first signal and a second signal;

obtaining a position relationship between the first signal and the second signal in frequency domain and/or time domain; and determining a subcarrier spacing of a channel based on the position relationship between the first signal and the second signal in frequency domain and/or time domain, where the channel includes a broadcast channel and/or a shared channel and/or a control channel.

In an example, the determining a subcarrier spacing of a channel based on the position relationship between the first signal and the second signal in frequency domain and/or time domain is specifically:

determining the subcarrier spacing of the channel based on a relative position relationship between the first signal and the second signal in frequency domain and/or time domain.

In an example, the determining a subcarrier spacing of a channel based on the position relationship between the first signal and the second signal in frequency domain and/or time domain includes:

determining, by the receive end device, the subcarrier spacing of the channel based on a frequency difference or a subcarrier sequence number difference between a subcarrier occupied by the second signal and a subcarrier occupied by the first signal.

In an example, the determining a subcarrier spacing of a channel based on the position relationship between the first signal and the second signal in frequency domain and/or time domain includes:

determining, by the receive end device, the subcarrier spacing of the channel based on a time difference or a symbol sequence number difference between a symbol occupied by the second signal and a symbol occupied by the first signal.

In an example, the determining a subcarrier spacing of a channel based on the position relationship between the first signal and the second signal in frequency domain and/or time domain includes:

determining, by the receive end device, the subcarrier spacing of the channel based on a frequency difference or a resource block sequence number difference between a resource block occupied by the second signal and a corresponding resource block occupied by the first signal.

In an example, the determining a subcarrier spacing of a channel based on the position relationship between the first signal and the second signal in frequency domain and/or time domain includes:

determining, by the receive end device, the subcarrier spacing of the channel based on a time difference or a resource block sequence number difference between a resource block occupied by the second signal and a corresponding resource block occupied by the first signal.

According to a fifth aspect, an embodiment of the present invention provides a downlink signal sending method, where the method includes:

indicating, by a transmit end device, position information of a first signal and/or a second signal in time domain based on a sequence of the first signal; and sending a frame including the first signal and the second signal.

In an example, the indicating, by a transmit end device, position information of a first signal and/or a second signal in time domain based on a sequence of the first signal is specifically:

indicating, by the transmit end device, the position information of the first signal and/or the second signal in time domain based on a root sequence number of the sequence of the first signal.

In an example, the position information of the first signal and/or the second signal in time domain is specifically:

one or more of a symbol sequence number, a subframe number, a frame number, a beam number, and a beam group number of the first signal and/or the second signal.

In an example, a value of the root sequence number is correspondingly determined based on one or more of a symbol sequence number, a subframe number, a frame number, a beam number, a beam group number, and a cell identity group number of the first signal and/or the second signal.

According to a sixth aspect, an embodiment of the present invention provides a downlink signal receiving method, where the method includes:

detecting, by a receive end device, a first signal to obtain a sequence of the first signal; and determining position information of the first signal and/or a second signal in time domain based on the sequence of the first signal.

In an example, the receive end device detects the first signal to obtain a root sequence number of the sequence of the first signal; and determines the position information of the first signal and/or the second signal in time domain based on the root sequence number of the sequence of the first signal.

In an example, that the receive end device detects the first signal to obtain a root sequence number of the first signal includes:

the receive end device detects the first signal to obtain the sequence of the first signal, and performs correlation detection on the first signal sequence obtained through detection and a first signal sequence obtained through calculation based on the root sequence number and a formula for generating a sequence of the first signal, to obtain a first signal having strongest correlation and a root sequence number corresponding to the first signal.

According to a seventh aspect, an embodiment of the present invention provides a downlink signal sending method, where the method includes:

indicating, by a transmit end device, a subcarrier spacing of a channel based on a sequence of a first signal; and sending a frame including the first signal, a second signal, and the channel, where the channel includes a broadcast channel and/or a shared channel and/or a control channel.

In an example, the indicating, by a transmit end device, a subcarrier spacing of a channel based on a sequence of a first signal is specifically:

indicating, by the transmit end device, the subcarrier spacing of the channel based on a root sequence number of the sequence of the first signal.

According to an eighth aspect, an embodiment of the present invention provides a downlink signal receiving method, where the method includes:

detecting, by a receive end device, a first signal to obtain a sequence of the first signal; and determining a subcarrier spacing of a channel based on the sequence of the first signal, where the channel includes a broadcast channel and/or a shared channel and/or a control channel.

In an example, the receive end device detects the first signal to obtain a root sequence number of the sequence of the first signal; and determines the subcarrier spacing of the channel based on the root sequence number of the sequence of the first signal.

In an example, the detecting, by a receive end device, a first signal to obtain a sequence of the first signal further includes:

detecting, by the receive end device, the first signal to obtain the sequence of the first signal, and performing correlation detection on the first signal sequence obtained through detection and a first signal sequence obtained through calculation based on the root sequence number and a formula for generating a sequence of the first signal, to obtain a first signal having strongest correlation and a root sequence number corresponding to the first signal.

According to a ninth aspect, an embodiment of the present invention provides a downlink signal sending method, where the method includes:

indicating, by a transmit end device, position information of a first signal and/or a second signal in time domain by using a third signal, where a position of the third signal is generated based on the position information of the first signal and/or the second signal in time domain; and sending a frame including the first signal, the second signal, and the third signal.

In an example, the method further includes: determining a sequence of the third signal based on the position information of the first signal and/or the second signal in time domain, and performing scrambling by using the cell identity.

In an example, the method further includes: determining a sequence of the third signal based on the cell identity, and performing scrambling by using the position information of the first signal and/or the second signal in time domain.

In an example, the position information of the first signal and/or the second signal in time domain is specifically: one or more of a symbol sequence number, a subframe number, a frame number, a beam number, and a beam group number of the first signal and/or the second signal.

According to a tenth aspect, an embodiment of the present invention provides a downlink signal receiving method, where the method includes:

receiving, by a receive end device, a frame including a first signal, a second signal, and a third signal;

detecting a sequence of the third signal, where a position of the third signal is generated based on position information of the first signal and/or the second signal in time domain; and determining the position information of the first signal and/or the second signal in time domain based on the sequence of the third signal.

In an example, the method further includes: detecting, by the receive end device, the first signal and/or the second signal to obtain the cell identity;

obtaining a scrambling sequence based on the cell identity, and detecting the third signal based on the scrambling sequence to obtain the sequence of the third signal; and determining the position information of the first signal and/or the second signal in time domain based on the sequence of the third signal.

In an example, the determining the position information of the first signal and/or the second signal in time domain based on the sequence of the third signal includes:

detecting the sequence of the third signal to obtain the sequence of the third signal, and determining the position information of the first signal and/or the second signal in time domain based on a root sequence number of the sequence of the third signal.

In an example, the position information of the first signal and/or the second signal in time domain is specifically:

one or more of a symbol sequence number, a subframe number, a frame number, a beam number, and a beam group number of the first signal and/or the second signal.

According to an eleventh aspect, an embodiment of the present invention provides a downlink signal sending method, where the method includes:

indicating, by a transmit end device, a subcarrier spacing of a channel by using a third signal, where a position of the third signal is generated based on position information of the first signal and/or a second signal in time domain; and sending a frame including the third signal and the channel, where the channel includes a broadcast channel and/or a shared channel and/or a control channel.

In an example, the method further includes:

determining a sequence of the third signal based on the position information of the first signal and/or the second signal in time domain, and performing scrambling by using a cell identity.

In an example, the method further includes:

determining a sequence of the third signal based on a cell identity, and performing scrambling by using the position information of the first signal and/or the second signal in time domain.

According to a twelfth aspect, an embodiment of the present invention provides a downlink signal receiving method, where the method includes:

receiving, by a receive end device, a frame including a first signal, a second signal, and a third signal;

detecting a sequence of the third signal, where a position of the third signal is generated based on position information of the first signal and/or the second signal in time domain; and determining a subcarrier spacing of a channel based on the sequence of the third signal, where the channel includes a broadcast channel and/or a shared channel and/or a control channel.

In an example, the method further includes:

detecting, by the receive end device, the first signal and/or the second signal to obtain the cell identity;

obtaining a scrambling sequence based on the cell identity, and detecting the third signal based on the scrambling sequence to obtain the sequence of the third signal; and determining the subcarrier spacing of the channel based on the sequence of the third signal.

In an example, the determining the subcarrier spacing of the channel based on the sequence of the third signal includes:

detecting the sequence of the third signal to obtain the sequence of the third signal, and determining the subcarrier spacing of the channel based on a root sequence number of the sequence of the third signal.

According to a thirteenth aspect, an embodiment of the present invention provides a transmit end device, including:

an indication unit, configured to indicate position information of a first signal and/or a second signal in time domain based on a position relationship between the first signal and the second signal in frequency domain and/or time domain; and a sending unit, configured to send a frame including the first signal and the second signal.

In an example, the position relationship between the first signal and the second signal in frequency domain and/or time domain is specifically:

a relative position relationship between the first signal and the second signal in frequency domain and/or time domain.

In an example, the indication unit is further configured to indicate the position information of the first signal and/or the second signal in time domain based on a frequency difference or a subcarrier sequence number difference between a subcarrier occupied by the second signal and a corresponding subcarrier occupied by the first signal.

In an example, the indication unit is further configured to indicate the position information of the first signal and/or the second signal in time domain based on a time difference or a symbol sequence number difference between a symbol occupied by the second signal and a symbol occupied by the first signal.

In an example, the indication unit is further configured to indicate the position information of the first signal and/or the second signal in time domain based on a frequency difference or a resource block sequence number difference between a resource block occupied by the second signal and a corresponding resource block occupied by the first signal.

In an example, the indication unit is further configured to indicate the position information of the first signal and/or the second signal in time domain based on a time difference or a resource block sequence number difference between a resource block occupied by the second signal and a corresponding resource block occupied by the first signal.

In an example, the position information of the first signal and/or the second signal in time domain is specifically: one or more of a symbol sequence number, a subframe number, a frame number, a beam number, and a beam group number of the first signal and/or the second signal.

According to a fourteenth aspect, an embodiment of the present invention provides a receive end device, including:

a receiving unit, configured to receive a frame including a first signal and a second signal;

an obtaining unit, configured to obtain a position relationship between the first signal and the second signal in frequency domain and/or time domain; and a determining unit, configured to determine position information of the first signal and/or the second signal in time domain based on the position relationship between the first signal and the second signal in frequency domain and/or time domain.

In an example, the obtaining a position relationship between the first signal and the second signal in frequency domain and/or time domain is specifically:

obtaining a relative position relationship between the first signal and the second signal in frequency domain and/or time domain.

In an example, the determining unit is specifically configured to determine the position information of the first signal and/or the second signal in time domain based on a frequency difference or a subcarrier sequence number difference between a subcarrier occupied by the second signal and a subcarrier occupied by the first signal.

In an example, the determining unit is specifically configured to determine the position information of the first signal and/or the second signal in time domain based on a time difference or a symbol sequence number difference between a symbol occupied by the second signal and a symbol occupied by the first signal.

In an example, the determining unit is specifically configured to indicate the position information of the first signal and/or the second signal in time domain based on a frequency difference or a resource block sequence number difference between a resource block occupied by the second signal and a corresponding resource block occupied by the first signal.

In an example, the determining unit is specifically configured to determine the position information of the first signal and/or the second signal in time domain based on a time difference or a resource block sequence number difference between a resource block occupied by the second signal and a corresponding resource block occupied by the first signal.

In an example, the position information of the first signal and/or the second signal in time domain is specifically:

one or more of a symbol sequence number, a subframe number, a frame number, a beam number, and a beam group number of the first signal and/or the second signal.

According to a fifteenth aspect, an embodiment of the present invention provides a transmit end device, including:

an indication unit, configured to indicate a subcarrier spacing of a channel based on a position relationship between a first signal and a second signal in frequency domain and/or time domain; and a sending unit, configured to send a frame including the first signal, the second signal, and the channel, where the channel includes a broadcast channel and/or a shared channel and/or a control channel.

In an example, the position relationship between the first signal and the second signal in frequency domain and/or time domain is specifically:

a relative position relationship between the first signal and the second signal in frequency domain and/or time domain.

In an example, the indication unit is specifically configured to indicate the subcarrier spacing of the channel based on a frequency difference or a subcarrier sequence number difference between a subcarrier occupied by the second signal and a corresponding subcarrier occupied by the first signal.

In an example, the indication unit is specifically configured to indicate the subcarrier spacing of the channel based on a time difference or a symbol sequence number difference between a symbol occupied by the second signal and a symbol occupied by the first signal.

In an example, the indication unit is specifically configured to indicate the subcarrier spacing of the channel based on a frequency difference or a resource block sequence number difference between a resource block occupied by the second signal and a corresponding resource block occupied by the first signal.

In an example, the indication unit is specifically configured to indicate the subcarrier spacing of the channel based on a time difference or a resource block sequence number difference between a resource block occupied by the second signal and a corresponding resource block occupied by the first signal.

According to a sixteenth aspect, an embodiment of the present invention provides a receive end device, including:

a receiving unit, configured to receive a frame including a first signal and a second signal;

an obtaining unit, configured to obtain a position relationship between the first signal and the second signal in frequency domain and/or time domain; and a determining unit, configured to determine a subcarrier spacing of a channel based on the position relationship between the first signal and the second signal in frequency domain and/or time domain, where the channel includes a broadcast channel and/or a shared channel and/or a control channel.

In an example, the determining unit is specifically configured to determine the subcarrier spacing of the channel based on a relative position relationship between the first signal and the second signal in frequency domain and/or time domain.

In an example, the determining unit is specifically configured to determine the subcarrier spacing of the channel based on a frequency difference or a subcarrier sequence number difference between a subcarrier occupied by the second signal and a subcarrier occupied by the first signal.

In an example, the determining unit is specifically configured to determine the subcarrier spacing of the channel based on a time difference or a symbol sequence number difference between a symbol occupied by the second signal and a symbol occupied by the first signal.

In an example, the determining unit is specifically configured to determine the subcarrier spacing of the channel based on a frequency difference or a resource block sequence number difference between a resource block occupied by the second signal and a corresponding resource block occupied by the first signal.

In an example, the determining unit is specifically configured to determine the subcarrier spacing of the channel based on a time difference or a resource block sequence number difference between a resource block occupied by the second signal and a corresponding resource block occupied by the first signal.

According to a seventeenth aspect, an embodiment of the present invention provides a transmit end device, including:

an indication unit, configured to indicate position information of a first signal and/or a second signal in time domain based on a sequence of the first signal; and a sending unit, configured to send a frame including the first signal and the second signal.

In an example, the indication unit is specifically configured to indicate the position information of the first signal and/or the second signal in time domain based on a root sequence of the sequence of the first signal.

In an example, the position information of the first signal and/or the second signal in time domain is specifically:

one or more of a symbol sequence number, a subframe number, a frame number, a beam number, and a beam group number of the first signal and/or the second signal.

In an example, a value of the root sequence number is correspondingly determined based on one or more of a symbol sequence number, a subframe number, a frame number, a beam number, a beam group number, and a cell identity group number of the first signal and/or the second signal.

According to an eighteenth aspect, an embodiment of the present invention provides a receive end device, including:

a detection unit, configured to detect a first signal to obtain a sequence of the first signal; and a determining unit, configured to determine position information of the first signal and/or a second signal in time domain based on the sequence of the first signal.

In an example, the detection unit is specifically configured to detect the first signal to obtain a root sequence number of the sequence of the first signal; and the determining unit is specifically configured to determine the position information of the first signal and/or the second signal in time domain based on the root sequence number of the sequence of the first signal.

In an example, the detection unit is specifically configured to detect the first signal to obtain the sequence of the first signal, and perform correlation detection on the first signal sequence obtained through detection and a first signal sequence obtained through calculation based on the root sequence number and a formula for generating a sequence of the first signal, to obtain a first signal having strongest correlation and a root sequence number corresponding to the first signal.

According to a nineteenth aspect, an embodiment of the present invention provides a transmit end device, including:

an indication unit, configured to indicate a subcarrier spacing of a channel based on a sequence of a first signal; and a sending unit, configured to send a frame including the first signal, a second signal, and the channel, where the channel includes a broadcast channel and/or a shared channel and/or a control channel.

In an example, the indication unit is specifically configured to indicate the subcarrier spacing of the channel based on a root sequence number of the sequence of the first signal.

According to a twentieth aspect, an embodiment of the present invention provides a receive end device, including:

a detection unit, configured to detect a first signal to obtain a sequence of the first signal; and a determining unit, configured to determine a subcarrier spacing of a channel based on the sequence of the first signal, where the channel includes a broadcast channel and/or a shared channel and/or a control channel.

In an example, the detection unit is specifically configured to determine the subcarrier spacing of the channel based on a root sequence number of the sequence of the first signal.

In an example, the detection unit is further configured to detect the first signal to obtain the sequence of the first signal, and perform correlation detection on the first signal sequence obtained through detection and a first signal sequence obtained through calculation based on the root sequence number and a formula for generating a sequence of the first signal, to obtain a first signal having strongest correlation and a root sequence number corresponding to the first signal.

According to a twenty-first aspect, an embodiment of the present invention provides a transmit end device, including:

an indication unit, configured to indicate position information of a first signal and/or a second signal in time domain by using a third signal, where a position of the third signal is generated based on the position information of the first signal and/or the second signal in time domain; and a sending unit, configured to send a frame including the first signal, the second signal, and the third signal.

In an example, the transmit end device further includes a determining unit, where the determining unit is configured to determine a sequence of the third signal based on the position information of the first signal and/or the second signal in time domain, and perform scrambling by using the cell identity.

In an example, the transmit end device further includes a determining unit, where the determining unit is configured to determine a sequence of the third signal based on the cell identity, and perform scrambling by using the position information of the first signal and/or the second signal in time domain.

In an example, the position information of the first signal and/or the second signal in time domain is specifically: one or more of a symbol sequence number, a subframe number, a frame number, a beam number, and a beam group number of the first signal and/or the second signal.

According to a twenty-second aspect, an embodiment of the present invention provides a receive end device, including:

a receiving unit, configured to receive a frame including a first signal, a second signal, and a third signal;

a detection unit, configured to detect a sequence of the third signal, where a position of the third signal is generated based on position information of the first signal and/or the second signal in time domain; and a determining unit, configured to determine the position information of the first signal and/or the second signal in time domain based on the sequence of the third signal.

In an example, the detection unit is specifically configured to detect the first signal and/or the second signal to obtain the cell identity; and the determining unit is specifically configured to obtain a scrambling sequence based on the cell identity, detect the third signal based on the scrambling sequence to obtain the sequence of the third signal, and determine the position information of the first signal and/or the second signal in time domain based on the sequence of the third signal.

In an example, the detection unit is further configured to detect the sequence of the third signal to obtain the sequence of the third signal; and the determining unit is further configured to determine the position information of the first signal and/or the second signal in time domain based on a root sequence number of the sequence of the third signal.

In an example, the position information of the first signal and/or the second signal in time domain is specifically:

one or more of a symbol sequence number, a subframe number, a frame number, a beam number, and a beam group number of the first signal and/or the second signal.

According to a twenty-third aspect, an embodiment of the present invention provides a transmit end device, including:

an indication unit, configured to indicate a subcarrier spacing of a channel by using a third signal, where a position of the third signal is generated based on position information of the first signal and/or a second signal in time domain; and a sending unit, configured to send a frame including the third signal and the channel, where the channel includes a broadcast channel and/or a shared channel and/or a control channel.

In an example, the transmit end device further includes a determining unit, where the determining unit is configured to determine a sequence of the third signal based on the position information of the first signal and/or the second signal in time domain, and perform scrambling by using a cell identity.

In an example, the transmit end device further includes a determining unit, where the determining unit is configured to determine a sequence of the third signal based on a cell identity, and perform scrambling by using the position information of the first signal and/or the second signal in time domain.

According to a twenty-fourth aspect, an embodiment of the present invention provides a receive end device, including:

a receiving unit, configured to receive a frame including a first signal, a second signal, and a third signal;

a detection unit, configured to detect a sequence of the third signal, where a position of the third signal is generated based on position information of the first signal and/or the second signal in time domain; and a determining unit, configured to determine a subcarrier spacing of a channel based on the sequence of the third signal, where the channel includes a broadcast channel and/or a shared channel and/or a control channel.

In an example, the detection unit is further configured to detect the first signal and/or the second signal to obtain the cell identity; and the determining unit is further configured to obtain a scrambling sequence based on the cell identity, detect the third signal based on the scrambling sequence to obtain the sequence of the third signal, and determine the subcarrier spacing of the channel based on the sequence of the third signal.

In an example, the determining unit is further configured to detect the sequence of the third signal to obtain the sequence of the third signal, and determine the subcarrier spacing of the channel based on a root sequence number of the sequence of the third signal.

According to a twenty-fifth aspect, an embodiment of the present invention provides a transmit end device, including:

a processor, configured to indicate position information of a first signal and/or a second signal in time domain based on a position relationship between the first signal and the second signal in frequency domain and/or time domain; and a transmitter, configured to send a frame including the first signal and the second signal.

In an example, the position relationship between the first signal and the second signal in frequency domain and/or time domain is specifically:

a relative position relationship between the first signal and the second signal in frequency domain and/or time domain.

In an example, the processor is further configured to indicate the position information of the first signal and/or the second signal in time domain based on a frequency difference or a subcarrier sequence number difference between a subcarrier occupied by the second signal and a corresponding subcarrier occupied by the first signal.

In an example, the processor is further configured to indicate the position information of the first signal and/or the second signal in time domain based on a time difference or a symbol sequence number difference between a symbol occupied by the second signal and a symbol occupied by the first signal.

In an example, the processor is further configured to indicate the position information of the first signal and/or the second signal in time domain based on a frequency difference or a resource block sequence number difference between a resource block occupied by the second signal and a corresponding resource block occupied by the first signal.

In an example, the processor is further configured to indicate the position information of the first signal and/or the second signal in time domain based on a time difference or a resource block sequence number difference between a resource block occupied by the second signal and a corresponding resource block occupied by the first signal.

In an example, the position information of the first signal and/or the second signal in time domain is specifically: one or more of a symbol sequence number, a subframe number, a frame number, a beam number, and a beam group number of the first signal and/or the second signal.

According to a twenty-sixth aspect, an embodiment of the present invention provides a receive end device, including:

a receiver, configured to receive a frame including a first signal and a second signal; and a processor, configured to obtain a position relationship between the first signal and the second signal in frequency domain and/or time domain, and determine position information of the first signal and/or the second signal in time domain based on the position relationship between the first signal and the second signal in frequency domain and/or time domain.

In an example, the obtaining a position relationship between the first signal and the second signal in frequency domain and/or time domain is specifically:

obtaining a relative position relationship between the first signal and the second signal in frequency domain and/or time domain.

In an example, the processor is specifically configured to determine the position information of the first signal and/or the second signal in time domain based on a frequency difference or a subcarrier sequence number difference between a subcarrier occupied by the second signal and a subcarrier occupied by the first signal.

In an example, the processor is specifically configured to determine the position information of the first signal and/or the second signal in time domain based on a time difference or a symbol sequence number difference between a symbol occupied by the second signal and a symbol occupied by the first signal.

In an example, the processor is specifically configured to indicate the position information of the first signal and/or the second signal in time domain based on a frequency difference or a resource block sequence number difference between a resource block occupied by the second signal and a corresponding resource block occupied by the first signal.

In an example, the processor is specifically configured to determine the position information of the first signal and/or the second signal in time domain based on a time difference or a resource block sequence number difference between a resource block occupied by the second signal and a corresponding resource block occupied by the first signal.

In an example, the position information of the first signal and/or the second signal in time domain is specifically:

one or more of a symbol sequence number, a subframe number, a frame number, a beam number, and a beam group number of the first signal and/or the second signal.

According to a twenty-seventh aspect, an embodiment of the present invention provides a transmit end device, including:

a processor, configured to indicate a subcarrier spacing of a channel based on a position relationship between a first signal and a second signal in frequency domain and/or time domain; and a transmitter, configured to send a frame including the first signal, the second signal, and the channel, where the channel includes a broadcast channel and/or a shared channel and/or a control channel.

In an example, the position relationship between the first signal and the second signal in frequency domain and/or time domain is specifically:

a relative position relationship between the first signal and the second signal in frequency domain and/or time domain.

In an example, the processor is specifically configured to indicate the subcarrier spacing of the channel based on a frequency difference or a subcarrier sequence number difference between a subcarrier occupied by the second signal and a corresponding subcarrier occupied by the first signal.

In an example, the processor is specifically configured to indicate the subcarrier spacing of the channel based on a time difference or a symbol sequence number difference between a symbol occupied by the second signal and a symbol occupied by the first signal.

In an example, the processor is specifically configured to indicate the subcarrier spacing of the channel based on a frequency difference or a resource block sequence number difference between a resource block occupied by the second signal and a corresponding resource block occupied by the first signal.

In an example, the processor is specifically configured to indicate the subcarrier spacing of the channel based on a time difference or a resource block sequence number difference between a resource block occupied by the second signal and a corresponding resource block occupied by the first signal.

According to a twenty-eighth aspect, an embodiment of the present invention provides a receive end device, including:

a receiver, configured to receive a frame including a first signal and a second signal; and a processor, configured to obtain a position relationship between the first signal and the second signal in frequency domain and/or time domain; and a determining unit, configured to determine a subcarrier spacing of a channel based on the position relationship between the first signal and the second signal in frequency domain and/or time domain, where the channel includes a broadcast channel and/or a shared channel and/or a control channel.

In an example, the processor is specifically configured to determine the subcarrier spacing of the channel based on a relative position relationship between the first signal and the second signal in frequency domain and/or time domain.

In an example, the processor is specifically configured to determine the subcarrier spacing of the channel based on a frequency difference or a subcarrier sequence number difference between a subcarrier occupied by the second signal and a subcarrier occupied by the first signal.

In an example, the processor is specifically configured to determine the subcarrier spacing of the channel based on a time difference or a symbol sequence number difference between a symbol occupied by the second signal and a symbol occupied by the first signal.

In an example, the processor is specifically configured to determine the subcarrier spacing of the channel based on a frequency difference or a resource block sequence number difference between a resource block occupied by the second signal and a corresponding resource block occupied by the first signal.

In an example, the processor is specifically configured to determine the subcarrier spacing of the channel based on a time difference or a resource block sequence number difference between a resource block occupied by the second signal and a corresponding resource block occupied by the first signal.

According to a twenty-ninth aspect, an embodiment of the present invention provides a transmit end device, including:

a processor, configured to indicate position information of a first signal and/or a second signal in time domain based on a sequence of the first signal; and a transmitter, configured to send a frame including the first signal and the second signal.

In an example, the processor is specifically configured to indicate the position information of the first signal and/or the second signal in time domain based on a root sequence of the sequence of the first signal.

In an example, the position information of the first signal and/or the second signal in time domain is specifically:

one or more of a symbol sequence number, a subframe number, a frame number, a beam number, and a beam group number of the first signal and/or the second signal.

In an example, a value of the root sequence number is correspondingly determined based on one or more of a symbol sequence number, a subframe number, a frame number, a beam number, a beam group number, and a cell identity group number of the first signal and/or the second signal.

According to a thirtieth aspect, an embodiment of the present invention provides a receive end device, including:

a receiver, configured to receive a frame including a first signal; and a processor, configured to detect the first signal to obtain a sequence of the first signal, and determine position information of the first signal and/or a second signal in time domain based on the sequence of the first signal.

In an example, the processor is specifically configured to detect the first signal to obtain a root sequence number of the sequence of the first signal, and determine the position information of the first signal and/or the second signal in time domain based on the root sequence number of the sequence of the first signal.

In an example, the processor is specifically configured to detect the first signal to obtain the sequence of the first signal, and perform correlation detection on the first signal sequence obtained through detection and a first signal sequence obtained through calculation based on the root sequence number and a formula for generating a sequence of the first signal, to obtain a first signal having strongest correlation and a root sequence number corresponding to the first signal.

According to a thirty-first aspect, an embodiment of the present invention provides a transmit end device, including:

a processor, configured to indicate a subcarrier spacing of a channel based on a sequence of a first signal; and a transmitter, configured to send a frame including the first signal, a second signal, and the channel, where the channel includes a broadcast channel and/or a shared channel and/or a control channel.

In an example, the processor is specifically configured to indicate the subcarrier spacing of the channel based on a root sequence number of the sequence of the first signal.

According to a thirty-second aspect, an embodiment of the present invention provides a receive end device, including:

a receiver, configured to receive a frame including a first signal; and a processor, configured to detect the first signal to obtain a sequence of the first signal, and determine a subcarrier spacing of a channel based on the sequence of the first signal, where the channel includes a broadcast channel and/or a shared channel and/or a control channel.

In an example, the processor is specifically configured to determine the subcarrier spacing of the channel based on a root sequence number of the sequence of the first signal.

In an example, the processor is further configured to detect the first signal to obtain the sequence of the first signal, and perform correlation detection on the first signal sequence obtained through detection and a first signal sequence obtained through calculation based on the root sequence number and a formula for generating a sequence of the first signal, to obtain a first signal having strongest correlation and a root sequence number corresponding to the first signal.

According to a thirty-third aspect, an embodiment of the present invention provides a transmit end device, including:

a processor, configured to indicate position information of a first signal and/or a second signal in time domain by using a third signal, where a position of the third signal is generated based on the position information of the first signal and/or the second signal in time domain; and a transmitter, configured to send a frame including the first signal, the second signal, and the third signal.

In an example, the processor is further configured to determine a sequence of the third signal based on the position information of the first signal and/or the second signal in time domain, and perform scrambling by using the cell identity.

In an example, the processor is further configured to determine a sequence of the third signal based on the cell identity, and perform scrambling by using the position information of the first signal and/or the second signal in time domain.

In an example, the position information of the first signal and/or the second signal in time domain is specifically: one or more of a symbol sequence number, a subframe number, a frame number, a beam number, and a beam group number of the first signal and/or the second signal.

According to a thirty-fourth aspect, an embodiment of the present invention provides a receive end device, including:

a receiver, configured to receive a frame including a first signal, a second signal, and a third signal; and a processor, configured to detect a sequence of the third signal, where a position of the third signal is generated based on position information of the first signal and/or the second signal in time domain, and determine the position information of the first signal and/or the second signal in time domain based on the sequence of the third signal.

In an example, the processor is specifically configured to detect the first signal and/or the second signal to obtain the cell identity; and the determining unit is specifically configured to obtain a scrambling sequence based on the cell identity, detect the third signal based on the scrambling sequence to obtain the sequence of the third signal, and determine the position information of the first signal and/or the second signal in time domain based on the sequence of the third signal.

In an example, the processor is further configured to detect the sequence of the third signal to obtain the sequence of the third signal; and the determining unit is further configured to determine the position information of the first signal and/or the second signal in time domain based on a root sequence number of the sequence of the third signal.

In an example, the position information of the first signal and/or the second signal in time domain is specifically:

one or more of a symbol sequence number, a subframe number, a frame number, a beam number, and a beam group number of the first signal and/or the second signal.

According to a thirty-fifth aspect, an embodiment of the present invention provides a transmit end device, including:

a processor, configured to indicate a subcarrier spacing of a channel by using a third signal, where a position of the third signal is generated based on position information of the first signal and/or a second signal in time domain; and a transmitter, configured to send a frame including the third signal and the channel, where the channel includes a broadcast channel and/or a shared channel and/or a control channel.

In an example, the processor is further configured to determine a sequence of the third signal based on the position information of the first signal and/or the second signal in time domain, and perform scrambling by using a cell identity.

In an example, the processor is further configured to determine a sequence of the third signal based on a cell identity, and perform scrambling by using the position information of the first signal and/or the second signal in time domain.

According to a thirty-sixth aspect, an embodiment of the present invention provides a receive end device, including:

a receiver, configured to receive a frame including a first signal, a second signal, and a third signal; and a processor, configured to detect a sequence of the third signal, where a position of the third signal is generated based on position information of the first signal and/or the second signal in time domain, and determine a subcarrier spacing of a channel based on the sequence of the third signal, where the channel includes a broadcast channel and/or a shared channel and/or a control channel.

In an example, the processor is further configured to detect the first signal and/or the second signal to obtain the cell identity; and the determining unit is further configured to obtain a scrambling sequence based on the cell identity, detect the third signal based on the scrambling sequence to obtain the sequence of the third signal, and determine the subcarrier spacing of the channel based on the sequence of the third signal.

In an example, the processor is further configured to detect the sequence of the third signal to obtain the sequence of the third signal, and determine the subcarrier spacing of the channel based on a root sequence number of the sequence of the third signal.

In the embodiments of the present invention, a position of a synchronization signal in time domain and a subcarrier spacing of a channel are indicated by using a relative position relationship of the synchronization signal in time domain or frequency domain. In addition, in the embodiments of the present invention, the position of the synchronization signal in time domain and the subcarrier spacing of the channel are indicated by using a root sequence number of a synchronization sequence. In addition, in the embodiments of the present invention, the position of the synchronization signal in time domain can be indicated by using a third signal. Therefore, a sequence number of a symbol in which the synchronization signal is located and a subframe number thereof can be distinguished in the embodiments of the present invention. In addition, sending of a single-symbol synchronization signal is supported in the embodiments of the present invention, and therefore a beam sweeping speed is increased.

DESCRIPTION OF EMBODIMENTS

The technical solutions according to the embodiments of the present invention are clearly and completely described in the following with reference to the accompanying drawings.

Figure 1:
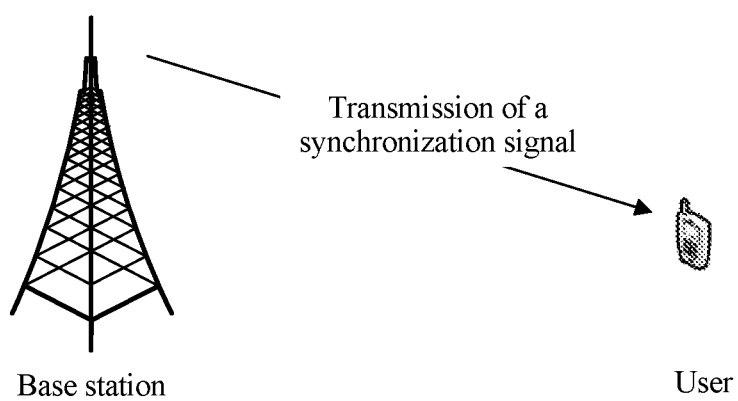
FIG. 1 is a schematic diagram of an application scenario according to the present invention.

As shown in FIG. 1, a transmit end device indicates position information of a first signal and/or a second signal in time domain based on a position relationship between the first signal and the second signal in frequency domain. For example, the transmit end device indicates symbol sequence numbers and/or subframe numbers of the first signal and the second signal based on a difference between a smallest subcarrier sequence number of the second signal and a largest subcarrier sequence number of the first signal. A receive end device receives a frame including the first signal and the second signal, obtains the position relationship between the first signal and the second signal in frequency domain and/or time domain, and determines the position information of the first signal and/or the second signal in time domain based on the position relationship between the first signal and the second signal in frequency domain and/or time domain. For example, the receive end device obtains the symbol sequence numbers and/or the subframe numbers of the first signal and the second signal based on the difference between the smallest subcarrier sequence number of the second signal and the largest subcarrier sequence number of the first signal.

Alternatively, the transmit end device indicates a subcarrier spacing of a channel based on a position relationship between a first signal and a second signal in frequency domain and/or time domain, where the channel includes a broadcast channel and/or a shared channel and/or a control channel. For example, the transmit end device indicates the subcarrier spacing of the channel based on a difference between a smallest subcarrier sequence number of the second signal and a largest subcarrier sequence number of the first signal. The receive end device receives a frame including the first signal and the second signal, obtains the position relationship between the first signal and the second signal in frequency domain and/or time domain, and determines the subcarrier spacing of the channel based on the position relationship between the first signal and the second signal in frequency domain and/or time domain. For example, the receive end device obtains the subcarrier spacing of the channel based on the difference between the smallest subcarrier sequence number of the second signal and the largest subcarrier sequence number of the first signal.

Alternatively, the transmit end device indicates position information of a first signal and/or a second signal in time domain based on a sequence of the first signal. For example, the transmit end device indicates symbol sequence numbers of the first signal and the second signal based on a root sequence number of the first signal, and a value of the root sequence number is determined based on the symbol sequence numbers. The receive end device receives a frame including the first signal and the second signal, and detects the first signal to obtain the sequence of the first signal. The receive end device determines the position information of the first signal and/or the second signal in time domain based on the sequence of the first signal. For example, the receive end device obtains the root sequence number of the sequence of the first signal, and determines the position information of the first signal and/or the second signal in time domain based on the root sequence number of the sequence of the first signal.

Alternatively, the transmit end device indicates a subcarrier spacing of a channel based on a sequence of a first signal, where the channel includes a broadcast channel and/or a shared channel and/or a control channel. The receive end device receives a frame including the first signal and a second signal, and detects the first signal to obtain the sequence of the first signal. The receive end device determines the subcarrier spacing of the channel based on the sequence of the first signal.

Alternatively, the transmit end device indicates position information of a first signal and/or a second signal in time domain by using a third signal, where a sequence of the third signal is generated based on the position information of the first signal and/or the second signal in time domain. The receive end device receives a frame including the first signal, the second signal, and the third signal, detects the sequence of the third signal, and determines the position information of the first signal and/or the second signal in time domain based on the sequence of the third signal.

Alternatively, the transmit end device indicates a subcarrier spacing of a channel by using a third signal, and sends a frame including the third signal and the channel, where the channel includes a broadcast channel and/or a shared channel and/or a control channel. The receive end device receives the frame including a first signal, a second signal, and the third signal, detects a sequence of the third signal, and determines the subcarrier spacing of the channel based on the sequence of the third signal.

The embodiments of the present invention are applicable to a Long Term Evolution (Long Term Evolution, LTE for short) system, a system subsequently evolved from an LTE system, a 5G system, and the like, or wireless communications systems using various radio access technologies, for example, cellular systems related to Wi-Fi, WiMAX, and 3GPP.

In addition, the transmit end device in the embodiments of the present invention may be a base station, a relay, an access device, or the like. The receive end device may be user equipment (User Equipment, UE for short), a mobile station (Mobile station, MS for short), a terminal (Terminal), or the like. In addition, the transmit end device may also be a transceiver device TRP, and the receive end device may also be a transceiver device TRP integrated in a device. An example in which the transmit end device is a base station and the receive end device is a terminal is used in the following merely for description.

Embodiment 1

Figure 2:
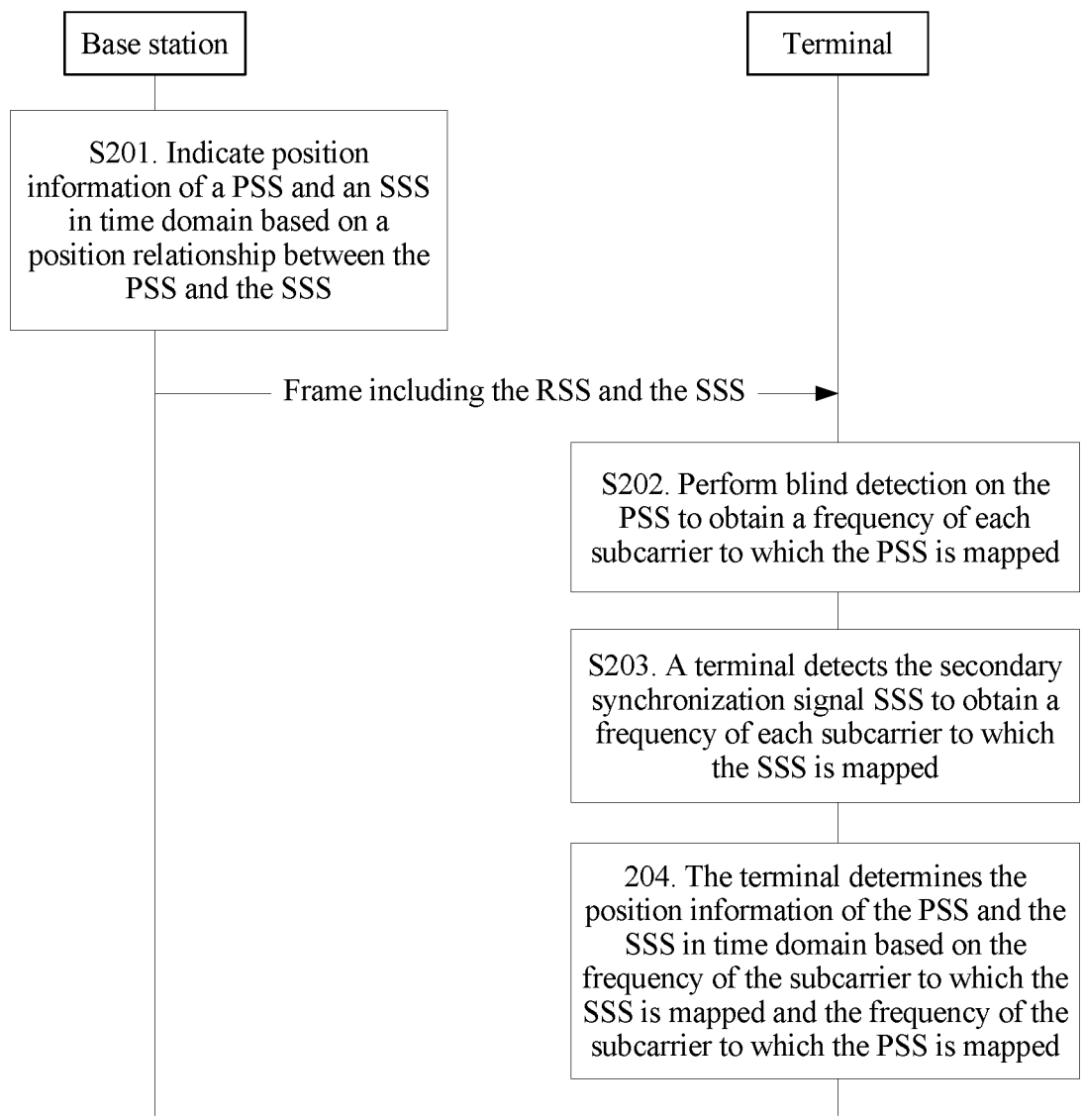
FIG. 2 is a schematic diagram of a downlink data sending and receiving method according to Embodiment 1 of the present invention.
Figure 3:
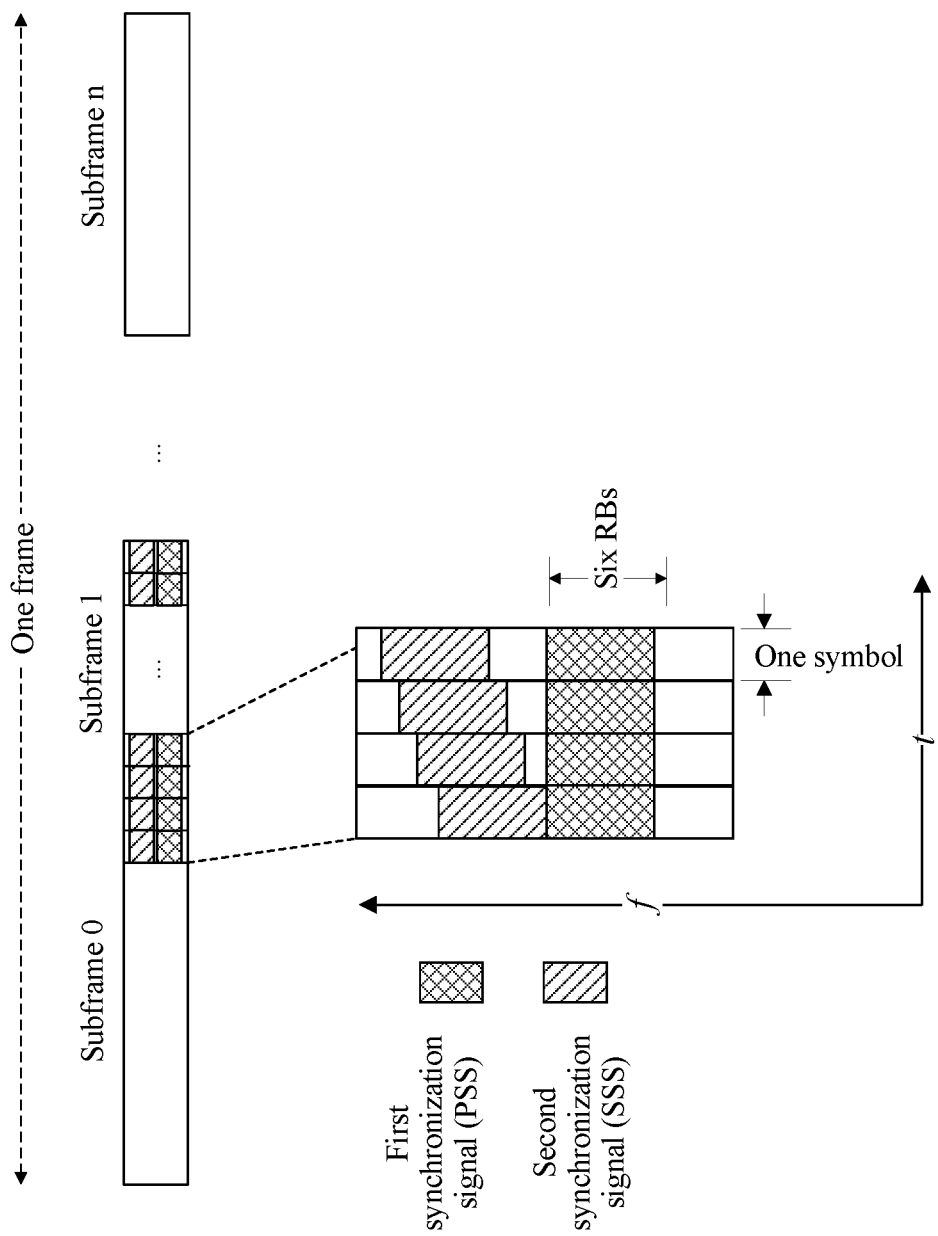
FIG. 3 is a schematic structural diagram of PSSs and SSSs of a plurality of symbols in a subframe according to Embodiment 1 of the present invention.

The following describes a downlink data sending and receiving method according to Embodiment 1 of the present invention in detail with reference to FIG. 2 and FIG. 3.

Step 201: A base station indicates position information of a first signal primary synchronization signal PSS and a second signal secondary synchronization signal SSS in time domain based on a relative position relationship between the first signal and the second signal in frequency domain.

It should be noted that, the base station may alternatively indicate the position information of the first signal and/or the second signal in time domain based on a position relationship between the first signal and the second signal in time domain. For ease of description, this embodiment of the present invention is described merely by using an example in which the base station indicates the position information of the first signal and the second signal in time domain based on the position relationship between the first signal and the second signal in frequency domain.

In an example, the base station indicates symbol sequence numbers and/or subframe numbers of the first signal and the second signal based on the relative position relationship between the PSS and the SSS in frequency domain. For example, referring to the following Table 1 and Table 3, the base station indicates the symbol sequence numbers and/or the subframe numbers of the PSS signal and the SSS signal based on a difference between a smallest subcarrier sequence number of the PSS and a largest subcarrier sequence number of the SSS. For another example, referring to the following Table 2 and Table 4, the base station indicates the symbol sequence numbers and/or the subframe numbers of the PSS signal and the SSS signal based on a difference between a smallest resource block RB sequence number of the PSS and a largest resource block RB sequence number of the SSS.

As shown in FIG. 3, the base station sends a PSS and an SSS on a plurality of symbols in a subframe 1, and the PSS and the SSS are in frequency division in frequency domain. For example, if a subframe includes 12 symbols, the base station sends the primary synchronization signal PSS and the secondary synchronization signal SSS on all or some of a symbol 0 to symbol 11 in the subframe 1 (for example, a symbol 0 to a symbol 3 shown in FIG. 3), and the primary synchronization signal PSS and the secondary synchronization signal SSS in a same beam are mapped to one symbol, for example, mapped to a same OFDM symbol.

It should be noted that, sending of a plurality of symbols in the subframe 1 is merely an example, and a specific subframe is not limited in this embodiment of the present invention.

Specifically, for the subframe 1, in time domain, each primary synchronization signal PSS and a secondary synchronization signal SSS in a same beam are mapped to one symbol. In frequency domain, each primary synchronization signal PSS is mapped to six resource blocks (resource block, RB). For example, the primary synchronization signal PSS is mapped to six RBs in a center of a frequency band, and the primary synchronization signal PSS is mapped to other subcarriers than five subcarriers having largest sequence numbers and five subcarriers having smallest sequence numbers in the six RBs. For example, each RB includes 12 subcarriers, and six RBs include 72 subcarriers in total; in this case, the primary synchronization signal PSS is mapped to other 62 consecutive subcarriers than five subcarriers having largest sequence numbers and five subcarriers having smallest sequence numbers. In frequency domain, the secondary synchronization signal SSS is mapped to other six consecutive RBs than the six RBs occupied by the PSS, and the secondary synchronization signal SSS is also mapped to other 62 subcarriers in the six RBs than five subcarriers having largest sequence numbers and five subcarriers having smallest sequence numbers. In time domain, each secondary synchronization signal SSS and a primary synchronization signal PSS in a same beam are mapped to one symbol.

It can be learned from FIG. 3 that, each primary synchronization signal PSS occupies a same subcarrier sequence number, but a subcarrier sequence number occupied by the secondary synchronization signal SSS increases as a symbol sequence number occupied by the SSS increases. In addition, the subcarrier sequence number occupied by the PSS may also decrease as the symbol sequence number occupied by the PSS increases (not shown in FIG. 3). In this case, a largest subcarrier sequence number of the SSS is less than a smallest subcarrier sequence number of the PSS. The following uses only the example in FIG. 3 for description.

In an example, the base station indicates symbol sequence numbers of the SSS and the PSS based on a difference between a smallest subcarrier sequence number of the SSS and a largest subcarrier sequence number of the PSS. Refer to the following Table 1.

TABLE 1

| Smallest subcarrier sequence number of the SSS | Symbol sequence number | Difference between the smallest subcarrier sequence number of the SSS and the largest subcarrier sequence number of the PSS |
| --- | --- | --- |
| a + 11 | 0 | 11 |
| a + 12 | 1 | 12 |
| a + 13 | 2 | 13 |
| a + 14 | 3 | 14 |
| a + 15 | 4 | 15 |
| a + 16 | 5 | 16 |
| a + 17 | 6 | 17 |
| a + 18 | 7 | 18 |
| a + 19 | 8 | 19 |
| a + 20 | 9 | 20 |
| a + 21 | 10 | 21 |
| a + 22 | 11 | 22 |

In Table 1, "a" indicates the largest subcarrier sequence number to which the PSS is mapped. As shown in Table 1, as the symbol sequence number increases, the difference between the smallest subcarrier sequence number to which the SSS is mapped and the largest subcarrier sequence number to which the PSS is mapped increases gradually.

It can be learned from Table 1 that the symbol sequence numbers of the PSS and the SSS can be obtained based on the difference between the smallest subcarrier sequence number to which the SSS is mapped and the largest subcarrier sequence number to which the PSS is mapped.

It should be noted that, in Table 1, for example, a minimum difference between the smallest subcarrier sequence number to which the SSS is mapped and the largest subcarrier sequence number to which the PSS is mapped is 11. Actually, the difference between the smallest subcarrier sequence number to which the SSS is mapped and the largest subcarrier sequence number to which the PSS is mapped may be any integer greater than or equal to 10. This is because the PSS and the SSS are mapped to subcarriers other than five subcarriers having largest sequence numbers and five subcarriers having smallest sequence numbers.

It should be noted that, in this embodiment of the present invention, the base station indicates the position information of the PSS and/or the SSS in time domain based on the difference between the smallest subcarrier sequence number occupied by the SSS and the largest subcarrier sequence number occupied by the PSS. A person skilled in the art may understand that this embodiment of the present invention is not limited thereto. For example, the base station may alternatively indicate the position information of the PSS and/or the SSS in time domain based on a difference between a second smallest subcarrier sequence number occupied by the SSS and a second largest subcarrier sequence number occupied by the PSS. Therefore, in this embodiment of the present invention, the base station indicates the position information of the first signal and/or the second signal in time domain based on a difference between a subcarrier sequence number occupied by the second signal SSS and a corresponding subcarrier sequence number occupied by the first signal SSS. In addition, in this embodiment of the present invention, the base station indicates the position information of the first signal and/or the second signal in time domain based on the difference between subcarrier sequence numbers, but this is not limited. The base station may alternatively indicate the position information of the first signal and/or the second signal in time domain based on a difference between a subcarrier frequency occupied by the second signal and a corresponding subcarrier frequency occupied by the first signal.

It can be learned that, in this embodiment of the present invention, the base station may indicate the position information of the first signal and/or the second signal in time domain based on the position relationship between the first signal and the second signal in frequency domain, but this is not limited. The base station may alternatively indicate the position information of the first signal and/or the second signal in time domain based on the position relationship between the first signal and the second signal in time domain. For example, the base station indicates the position information of the first signal and/or the second signal in time domain based on a time difference or a symbol sequence number difference between a symbol occupied by the second signal and a symbol occupied by the first signal.

In the foregoing Table 1, the symbol sequence numbers of the PSS and the SSS are indicated based on the difference between the smallest subcarrier sequence number to which the SSS is mapped and the largest subcarrier sequence number to which the PSS is mapped, that is, a subcarrier-level adjustment granularity. Actually, the symbol sequence numbers of the PSS and the SSS may be alternatively indicated based on a difference between a smallest resource block RB sequence number to which the SSS is mapped and a largest resource block RB sequence number to which the PSS is mapped, that is, by using an RB-level adjustment granularity. For details, refer to the following Table 2.

TABLE 2

| Smallest RB sequence number of the SSS | Symbol sequence number | Difference between the smallest RB sequence number of the SSS and the largest RB sequence number of the PSS |
|---|---|---|
| b + 1 | 0 | 1 |
| b + 2 | 1 | 2 |
| b + 3 | 2 | 3 |
| b + 4 | 3 | 4 |
| b + 5 | 4 | 5 |
| b + 6 | 5 | 6 |
| b + 7 | 6 | 7 |
| b + 8 | 7 | 8 |
| b + 9 | 8 | 9 |
| b + 10 | 9 | 10 |
| b + 11 | 10 | 11 |
| b + 12 | 11 | 12 |

In Table 2, "b" indicates the largest RB sequence number to which the PSS is mapped. As shown in Table 2, as the symbol sequence number increases, the difference between the smallest RB sequence number to which the SSS is mapped and the largest RB sequence number to which the PSS is mapped increases gradually.

It should be noted that, in Table 2, for example, the difference between the smallest RB sequence number to which the SSS is mapped and the largest RB sequence number to which the PSS is mapped is 1. Actually, the difference between the smallest RB sequence number to which the SSS is mapped and the largest RB sequence number to which the PSS is mapped may be any integer greater than or equal to 1.

It can be learned that the base station sends the primary synchronization signal PSS and the secondary synchronization signal SSS on a plurality of symbols in a subframe, for example, the subframe 1, and indicates the symbol sequence numbers of the PSS and the SSS based on the position relationship between the primary synchronization signal PSS and the secondary synchronization signal SSS in frequency domain. In addition, the base station may alternatively send the PSS and the SSS in a plurality of subframes in a frame, and indicate the subframe numbers and the symbol sequence numbers of the PSS and the SSS based on the position relationship between the PSS and the SSS in frequency domain. In addition, the base station may send the PSS and the SSS on all symbols of all subframes in a frame, or may send the PSS and the SSS on all symbols of some subframes in a frame, or may send the PSS and the SSS on some symbols of some subframes in a frame. The following uses an example in which a synchronization signal is sent on some symbols, namely a symbol 0 to a symbol 5, in some subframes, namely a subframe 0 and a subframe 1, in a frame, to describe sending of a plurality of symbols in a plurality of subframes in a frame by the base station to indicate the symbol sequence numbers of the PSS and the SSS.

TABLE 3

| Smallest subcarrier sequence number of the SSS | Subframe number and symbol sequence number | Difference between the smallest subcarrier sequence number of the SSS and the largest subcarrier sequence number of the PSS |
|---|---|---|
| a + 11 | 00 | 11 |
| a + 12 | 01 | 12 |
| a + 13 | 02 | 13 |
| a + 14 | 03 | 14 |
| a + 15 | 04 | 15 |
| a + 16 | 05 | 16 |
| a + 17 | 10 | 17 |
| a + 18 | 11 | 18 |
| a + 19 | 12 | 19 |
| a + 20 | 13 | 20 |
| a + 21 | 14 | 21 |
| a + 22 | 15 | 22 |

In Table 3, "a" indicates the largest subcarrier sequence number to which the PSS is mapped. In addition, in the list of subcarriers and symbol sequence numbers in Table 3, 00 indicates a symbol 0 of the subframe 0, 01 indicates a symbol 1 of the subframe 0, 02 indicates a symbol 2 of the subframe 0, 03 indicates a symbol 3 of the subframe 0, 04 indicates a symbol 4 of the subframe 0, 05 indicates a symbol 5 of the subframe 0, 10 indicates a symbol 0 of the subframe 1, 11 indicates a symbol 1 of the subframe 1, 12 indicates a symbol 2 of the subframe 1, 13 indicates a symbol 3 of the subframe 1, 14 indicates a symbol 4 of the subframe 1, and 15 indicates a symbol 5 of the subframe 1.

It can be learned from Table 3 that the subframe numbers and the symbol sequence numbers of the PSS and the SSS can be indicated based on the difference between the smallest subcarrier sequence number of the SSS and the largest subcarrier sequence number of the PSS.

It should be noted that, in Table 3, for example, a minimum difference between the smallest subcarrier sequence number of the SSS and the largest subcarrier sequence number of the PSS is 11. Actually, the difference between the smallest subcarrier sequence number of the SSS and the largest subcarrier sequence number of the PSS may be any integer greater than or equal to 10. This is because the PSS and the SSS are mapped to subcarriers other than five subcarriers having largest sequence numbers and five subcarriers having smallest sequence numbers.

In the foregoing Table 3, for example, the subframe numbers and the symbol sequence numbers of the PSS and the SSS are indicated based on the difference between the smallest subcarrier sequence number of the SSS and the largest subcarrier sequence number of the PSS, that is, a subcarrier-level adjustment granularity. Actually, the subframe numbers and the symbol sequence numbers of the PSS and the SSS may be alternatively indicated based on a difference between a smallest resource block RB sequence number of the SSS and a largest resource block RB sequence number of the PSS, that is, by using an RB-level adjustment granularity. For details, refer to the following Table 4.

TABLE 4

| Smallest RB sequence number of the SSS | Subframe number and symbol sequence number | Difference between the smallest RB sequence number of the SSS and the largest RB sequence number of the PSS |
|---|---|---|
| b + 1 | 00 | 1 |
| b + 2 | 01 | 2 |
| b + 3 | 02 | 3 |
| b + 4 | 03 | 4 |

TABLE 4-continued

| Smallest RB sequence number of the SSS | Subframe number and symbol sequence number | Difference between the smallest RB sequence number of the SSS and the largest RB sequence number of the PSS |
|---|---|---|
| b + 5 | 04 | 5 |
| b + 6 | 05 | 6 |
| b + 7 | 10 | 7 |
| b + 8 | 11 | 8 |
| b + 9 | 12 | 9 |
| b + 10 | 13 | 10 |
| b + 11 | 14 | 11 |
| b + 12 | 15 | 12 |

In Table 4, "b" indicates the largest RB sequence number to which the PSS is mapped. In addition, in the list of subcarriers and symbol sequence numbers in Table 4, 00 indicates a symbol 0 of the subframe 0, 01 indicates a symbol 1 of the subframe 0, 02 indicates a symbol 2 of the subframe 0, 03 indicates a symbol 3 of the subframe 0, 04 indicates a symbol 4 of the subframe 0, 05 indicates a symbol 5 of the subframe 0, 10 indicates a symbol 0 of the subframe 1, 11 indicates a symbol 1 of the subframe 1, 12 indicates a symbol 2 of the subframe 1, 13 indicates a symbol 3 of the subframe 1, 14 indicates a symbol 4 of the subframe 1, and 15 indicates a symbol 5 of the subframe 1.

It should be noted that, in Table 4, for example, the difference between the smallest RB sequence number to which the SSS is mapped and the largest RB sequence number to which the PSS is mapped is 1. Actually, the difference between the smallest RB sequence number to which the SSS is mapped and the largest RB sequence number to which the PSS is mapped may be any integer greater than or equal to 1.

It should be noted that, in this embodiment of the present invention, the base station indicates the position information of the PSS and/or the SSS in time domain based on the difference between a smallest resource block RB sequence number occupied by the SSS and the largest resource block RB sequence number occupied by the PSS. A person skilled in the art may understand that this embodiment of the present invention is not limited thereto. For example, the base station may alternatively indicate the position information of the PSS and/or the SSS in time domain based on a difference between a second smallest resource block RB sequence number occupied by the SSS and a second largest resource block RB sequence number occupied by the PSS. Therefore, in this embodiment of the present invention, the base station indicates the position information of the first signal and/or the second signal in time domain based on a difference between a resource block RB sequence number occupied by the second signal SSS and a corresponding resource block RB sequence number occupied by the first signal SSS. In addition, in this embodiment of the present invention, the base station indicates the position information of the first signal and/or the second signal in time domain based on the difference between resource block RB sequence numbers, but this is not limited. The base station may alternatively indicate the position information of the first signal and/or the second signal in time domain based on a difference between a resource block RB frequency occupied by the second signal and a corresponding resource block RB frequency occupied by the first signal.

It can be learned that, in this embodiment of the present invention, the base station may indicate the position information of the first signal and/or the second signal in time domain based on the position relationship between the first signal and the second signal in frequency domain, but this is not limited. The base station may alternatively indicate the position information of the first signal and/or the second signal in time domain based on the position relationship between the first signal and the second signal in time domain. For example, the base station indicates the position information of the first signal and/or the second signal in time domain based on a time difference or a symbol sequence number difference between a symbol occupied by the second signal and a symbol occupied by the first signal.

It can be learned that the base station may send the primary synchronization signal PSS and the secondary synchronization signal SSS on a plurality of symbols in a subframe, and indicate the symbol sequence numbers of the PSS and the SSS based on the position relationship between the primary synchronization signal PSS and the secondary synchronization signal SSS in frequency domain. The base station may alternatively send the PSS and the SSS in a plurality of subframes in a frame, and indicate the subframe numbers and the symbol sequence numbers of the PSS and the SSS based on the position relationship between the PSS and the SSS in frequency domain. In addition, the base station may further send the PSS and the SSS in a plurality of frames, and indicate frame numbers, the subframe numbers, and the symbol sequence numbers of the PSS and the SSS based on the position relationship between the PSS and the SSS in frequency domain. In addition, the base station may further indicate a beam group number and a beam number based on the position relationship between the PSS and the SSS in frequency domain. In other words, the base station indicates one or more of a symbol sequence number, a subframe number, a frame number, a beam number, and a beam group number of a synchronization signal based on a position relationship between synchronization signals in frequency domain, for example, a difference between a smallest subcarrier sequence number of the SSS and a largest subcarrier sequence number of the PSS.

In addition, in this embodiment of the present invention, the position information of the synchronization signals in time domain is determined based on the difference between the smallest subcarrier sequence number of the SSS (or the smallest RB sequence number of the SSS) and the largest subcarrier sequence number of the PSS (or the largest RB sequence number of the PSS), but this is not limited. For example, in this embodiment of the present invention, the position information of the primary synchronization signal PSS and the secondary synchronization signal SSS may be determined based on the position relationship between the PSS and the SSS mapped to adjacent subcarriers on a same symbol through comb frequency division. The mapping through comb frequency division indicates that the PSS and the SSS are mapped to one symbol in time domain, and that the PSS and the SSS are cross-mapped to each subcarrier in frequency domain. For example, in time domain, the PSS and the SSS are mapped to a symbol 1; in frequency domain, the PSS is mapped to subcarriers 0, 2, 4, 6, 8, . . . , and the SSS is mapped to subcarriers 1, 3, 5, 7.

The following continues to describe how the base station indicates a physical cell identifier (Physical Cell Identifier, PCI for short in English).

The physical cell identifier PCI is used by a terminal to distinguish between radio signals of different cells. The PCI is indicated by a cell ID group number and a cell ID. The base station indicates the cell ID group number (cell identity group number) by using a PSS sequence, and indicates a cell ID (cell identity) by using one of an SSS sequence set 1 and an SSS sequence set 2, where the cell ID may be a physical cell ID or may be a virtual cell ID or may be a super cell ID.

For example, there are three PSS sequences. The base station indicates cell ID group numbers 0, 1, and 2 by using the three PSS sequences respectively. The SSS sequence set 1 and the SSS sequence set 2 each include 168 different sequences. The base station indicates cell IDs 0 to 167 respectively by using the 168 different sequences in the SSS sequence set 1 or the SSS sequence set 2.

Step 202: A terminal receives a frame including the primary synchronization signal PSS and the secondary synchronization signal SSS, and performs blind detection on the PSS to obtain a frequency of each subcarrier to which the PSS is mapped, including a highest frequency of a subcarrier to which the PSS is mapped.

Further, the terminal obtains a PSS sequence by detecting the PSS, to further determine a cell ID group number.

Step 203: The terminal detects the secondary synchronization signal SSS to obtain a frequency of each subcarrier to which the SSS is mapped, including a highest frequency of a subcarrier to which the PSS is mapped. Further, the terminal obtains an SSS sequence by detecting the SSS, to further determine a cell ID. The terminal further determines a physical cell identifier PCI based on the cell ID and the cell ID group number (obtained in step 202). Then the terminal may determine a scrambling manner of a signal and a channel in a communication process based on the PCI.

Step 204: The terminal determines the position information of the PSS and the SSS in time domain based on the frequency of the subcarrier to which the SSS is mapped and the frequency of the subcarrier to which the PSS is mapped.

Specifically, the terminal obtains the difference between the smallest subcarrier sequence number of the SSS and the largest subcarrier sequence number of the PSS based on a difference between a lowest subcarrier frequency of the SSS and a highest subcarrier frequency of the PSS, and determines the position information of the PSS and the SSS in time domain by querying a table. For example, by querying a table and based on a difference obtained through calculation, the terminal determines symbol sequence numbers to which the SSS and the PSS are mapped.

It should be noted that, in the foregoing steps 202 to 204, the terminal determines the position information of the first signal and/or the second signal in time domain based on the position relationship between the first signal PSS and the second signal SSS in frequency domain, for example, based on the difference between the smallest subcarrier sequence number of the SSS and the largest subcarrier sequence number of the PSS. Actually, this embodiment of the present invention is not limited thereto. The terminal in this embodiment of the present invention may further determine the position information of the first signal and/or the second signal in time domain based on the position relationship between the PSS and the SSS in time domain. A specific implementation method is the same as steps 202 to 204, and is not described herein again.

It should be noted that, the following examples are used in the foregoing description: The base station sends the PSS and the SSS on a plurality of symbols in a subframe, and the terminal detects the plurality of symbols in the subframe to determine symbol sequence numbers of the PSS and the SSS; and the base station sends the PSS and the SSS in a plurality of subframes in a frame, and further, the subframe numbers and the symbol sequence numbers of the PSS and the SSS are determined. Actually, this embodiment of the present invention is not limited thereto. A person skilled in the art may understand that, when the base station determines the frame number and/or the beam number and/or the beam group number based on the relative position relationship between the PSS and the SSS in frequency domain, the terminal can also determine the corresponding frame number and/or the beam number and/or the beam group number based on the detected relative position relationship between the PSS and the SSS in frequency domain. The method is the same as the method for determining a symbol sequence number, and is not described herein again.

Embodiment 2

In an existing communications system, for example, in an LTE system, a subcarrier spacing is fixed. However, in a future communications system, for example, in a 5G communications system, a subcarrier spacing may not be fixed. For a subcarrier spacing that is not fixed, the prior art does not resolve a problem about how a base station indicates the subcarrier spacing and how a terminal determines the subcarrier spacing. Embodiment 2 of the present invention provides a method to resolve the problem.

Figure 4:
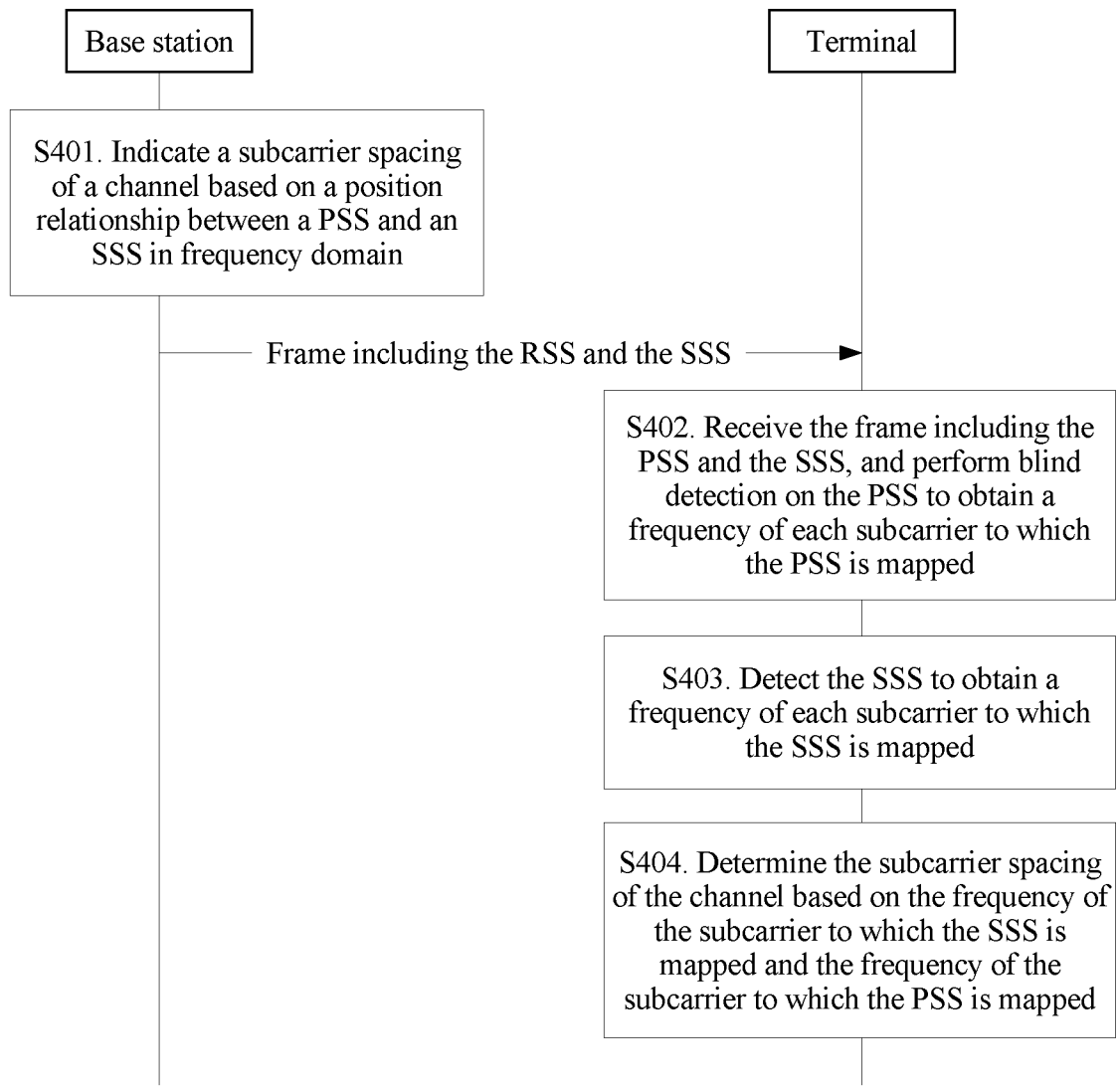
FIG. 4 is a schematic diagram of a downlink data sending and receiving method according to Embodiment 2 of the present invention.

The following describes a downlink data sending and receiving method according to Embodiment 2 of the present invention in detail with reference to FIG. 4.

Step 401: A base station indicates a subcarrier spacing of a channel based on a position relationship between a first signal primary synchronization signal PSS and a second signal secondary synchronization signal SSS in frequency domain, where the channel includes a broadcast channel and/or a shared channel and/or a control channel.

It should be noted that, the base station may alternatively indicate the subcarrier spacing of the channel based on a position relationship between the first signal PSS and the second signal SSS in time domain. For ease of description, this embodiment of the present invention is described merely by using an example in which the base station indicates the subcarrier spacing of the channel based on the position relationship between the first signal and the second signal in frequency domain.

In an example, the base station indicates the subcarrier spacing of the channel based on a relative position relationship between the PSS and the SSS in frequency domain. For example, referring to the following Table 5, the base station indicates the subcarrier spacing of the channel based on a difference between a smallest subcarrier sequence number of the PSS and a largest subcarrier sequence number of the SSS. For another example, referring to the following Table 6, the base station indicates the subcarrier spacing of the channel based on a difference between a smallest resource block RB sequence number of the PSS and a largest resource block RB sequence number of the SSS.

TABLE 5

| Smallest subcarrier sequence number of the SSS | Subcarrier spacing type | Difference between the smallest subcarrier sequence number of the SSS and the largest subcarrier sequence number of the PSS |
|---|---|---|
| a + 11 | 1 | 11 |
| a + 12 | 2 | 12 |
| a + 13 | 3 | 13 |
| a + 14 | 4 | 14 |
| a + 15 | 5 | 15 |
| a + 16 | 6 | 16 |
| a + 17 | 7 | 17 |
| a + 18 | 8 | 18 |
| a + 19 | 9 | 19 |
| a + 20 | 10 | 20 |

TABLE 5-continued

| Smallest subcarrier sequence number of the SSS | Subcarrier spacing type | Difference between the smallest subcarrier sequence number of the SSS and the largest subcarrier sequence number of the PSS |
|---|---|---|
| a + 21 | 11 | 21 |
| a + 22 | 12 | 22 |

In Table 5, "a" indicates the largest subcarrier sequence number to which the PSS is mapped. A person skilled in the art may understand that a specific numeric value of the subcarrier spacing is merely an example, and the specific numeric value of the subcarrier spacing is not limited in this embodiment of the present invention. For example, a subcarrier spacing type n indicates a (15*2n) KHz subcarrier spacing.

It can be learned from Table 5 that the subcarrier spacing of the channel can be obtained based on the difference between the smallest subcarrier sequence number of the SSS and the largest subcarrier sequence number of the PSS.

It should be noted that, in Table 5, for example, a minimum difference between the smallest subcarrier sequence number to which the SSS is mapped and the largest subcarrier sequence number to which the PSS is mapped is 11. Actually, the difference between the smallest subcarrier sequence number to which the SSS is mapped and the largest subcarrier sequence number to which the PSS is mapped may be any integer greater than or equal to 10.

It should be noted that, in this embodiment of the present invention, the base station indicates the subcarrier spacing of the channel based on the difference between the smallest subcarrier sequence number occupied by the SSS and the largest subcarrier sequence number occupied by the PSS. A person skilled in the art may understand that this embodiment of the present invention is not limited thereto. For example, the base station may alternatively indicate the subcarrier spacing of the channel based on a difference between a second smallest subcarrier sequence number occupied by the SSS and a second largest subcarrier sequence number occupied by the PSS. Therefore, the base station in this embodiment of the present invention indicates the subcarrier spacing of the channel based on a difference between a subcarrier sequence number occupied by the second signal SSS and a corresponding subcarrier sequence number occupied by the first signal SSS. In addition, the base station in this embodiment of the present invention indicates the subcarrier spacing of the channel based on the difference between subcarrier sequence numbers, but this is not limited. The base station may alternatively indicate the subcarrier spacing of the channel based on a difference between a subcarrier frequency occupied by the second signal and a corresponding subcarrier frequency occupied by the first signal.

It can be learned that the base station in this embodiment of the present invention indicates the subcarrier spacing of the channel based on the position relationship between the first signal and the second signal in frequency domain, but this is not limited. The base station may alternatively indicate the subcarrier spacing of the channel based on the position relationship between the first signal and the second signal in time domain. For example, the base station indicates the subcarrier spacing of the channel based on a time difference or a symbol sequence number difference between a symbol occupied by the second signal and a symbol occupied by the first signal.

In the foregoing Table 5, for example, the subcarrier spacing of the channel is indicated based on the difference between the smallest subcarrier sequence number of the SSS and the largest subcarrier sequence number of the PSS, that is, a subcarrier-level adjustment granularity. Actually, the subcarrier spacing of the channel may be alternatively indicated based on a difference between a smallest resource block RB sequence number of the SSS and a largest resource block RB sequence number of the PSS, that is, by using an RB-level adjustment granularity. For details, refer to the following Table 6.

TABLE 6

| Smallest RB sequence number of the SSS | Subcarrier spacing type | Difference between the smallest RB sequence number of the SSS and the largest RB sequence number of the PSS |
|---|---|---|
| b + 1 | 1 | 1 |
| b + 2 | 2 | 2 |
| b + 3 | 3 | 3 |
| b + 4 | 4 | 4 |
| b + 5 | 5 | 5 |
| b + 6 | 6 | 6 |
| b + 7 | 7 | 7 |
| b + 8 | 8 | 8 |
| b + 9 | 9 | 9 |
| b + 10 | 10 | 10 |
| b + 11 | 11 | 11 |
| b + 12 | 12 | 12 |

In Table 6, "b" indicates the largest RB sequence number to which the PSS is mapped. A person skilled in the art may understand that a specific numeric value of the subcarrier spacing in Table 6 is merely an example, and this is not limited in this embodiment of the present invention.

It should be noted that, in Table 6, for example, the difference between the smallest RB sequence number to which the SSS is mapped and the largest RB sequence number to which the PSS is mapped is 1. Actually, the difference between the smallest RB sequence number to which the SSS is mapped and the largest RB sequence number to which the PSS is mapped may be any integer greater than or equal to 1.

It should be noted that, in this embodiment of the present invention, the base station indicates the subcarrier spacing of the channel based on the difference between the smallest resource block RB sequence number occupied by the SSS and the largest resource block RB sequence number occupied by the PSS. A person skilled in the art may understand that this embodiment of the present invention is not limited thereto. For example, the base station may alternatively indicate the subcarrier spacing of the channel based on a difference between a second smallest resource block RB sequence number occupied by the SSS and a second largest resource block RB sequence number occupied by the PSS. Therefore, the base station in this embodiment of the present invention indicates the subcarrier spacing of the channel based on a difference between a resource block RB sequence number occupied by the second signal SSS and a corresponding resource block RB sequence number occupied by the first signal SSS. In addition, in this embodiment of the present invention, the base station indicates the position information of the first signal and/or the second signal in time domain based on the difference between resource block RB sequence numbers, but this is not limited. The base station may alternatively indicate the subcarrier spacing of the channel based on a difference between a resource block RB frequency occupied by the second signal and a corresponding resource block RB frequency occupied by the first signal.

It can be learned that the base station in this embodiment of the present invention indicates the subcarrier spacing of the channel based on the position relationship between the first signal and the second signal in frequency domain, but this is not limited. The base station may alternatively indicate the subcarrier spacing of the channel based on the position relationship between the first signal and the second signal in time domain. For example, the base station indicates the subcarrier spacing of the channel based on a time difference or a symbol sequence number difference between a symbol occupied by the second signal and a symbol occupied by the first signal.

In addition, in this embodiment of the present invention, the subcarrier spacing of the channel is determined based on the difference between the smallest subcarrier sequence number of the SSS (or the smallest RB sequence number of the SSS) and the largest subcarrier sequence number of the PSS (or the largest RB sequence number of the PSS), but this is not limited. For example, in this embodiment of the present invention, the subcarrier spacing of the channel may also be determined based on the position relationship between the PSS and the SSS mapped to adjacent subcarriers on a same symbol through comb frequency division.

Step 402: A terminal receives a frame including the primary synchronization signal PSS and the secondary synchronization signal SSS, and performs blind detection on the PSS to obtain a frequency of each subcarrier to which the PSS is mapped, including a highest frequency of a subcarrier to which the PSS is mapped.

Further, the terminal obtains a PSS sequence by detecting the PSS, to further determine a cell ID group number.

Step 403: The terminal detects the secondary synchronization signal SSS to obtain a frequency of each subcarrier to which the SSS is mapped, including a highest frequency of a subcarrier to which the PSS is mapped.

Further, the terminal obtains an SSS sequence by detecting the SSS, to further determine a cell ID. The terminal further determines a physical cell identifier PCI based on the cell ID and the cell ID group number (obtained in step 202). Then the terminal may determine a scrambling manner of a signal and a channel in a communication process based on the PCI.

Step 404: The terminal determines the subcarrier spacing of the channel based on the frequency of the subcarrier to which the SSS is mapped and the frequency of the subcarrier to which the PSS is mapped.

Specifically, the terminal obtains the difference between the smallest subcarrier sequence number of the SSS and the largest subcarrier sequence number of the PSS based on a difference between a lowest subcarrier frequency of the SSS and a highest subcarrier frequency of the PSS, and determines the subcarrier spacing of the channel by querying a table. For example, the terminal determines the subcarrier spacing of the channel by querying Table 5 or Table 6 and based on the difference obtained through calculation.

Embodiment 3

Figure 5:
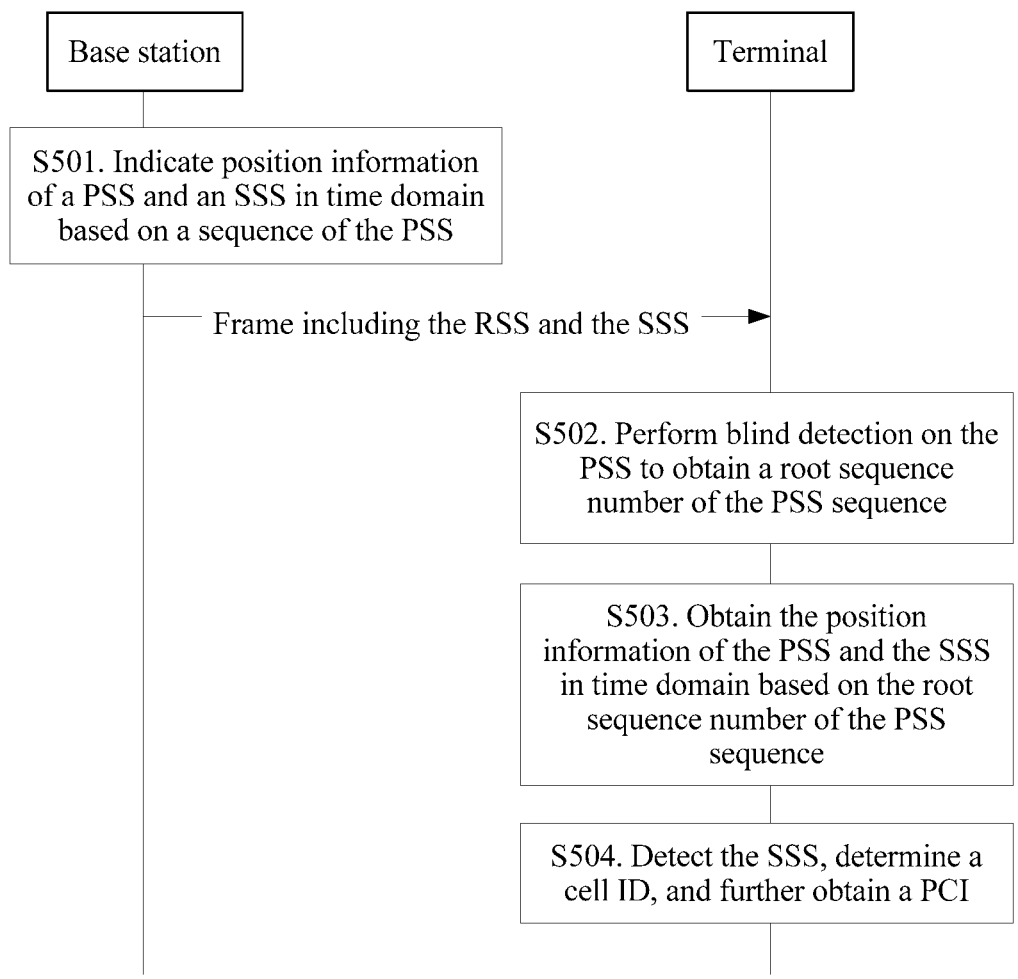
FIG. 5 is a schematic diagram of a downlink data sending and receiving method according to Embodiment 3 of the present invention.
Figure 6:
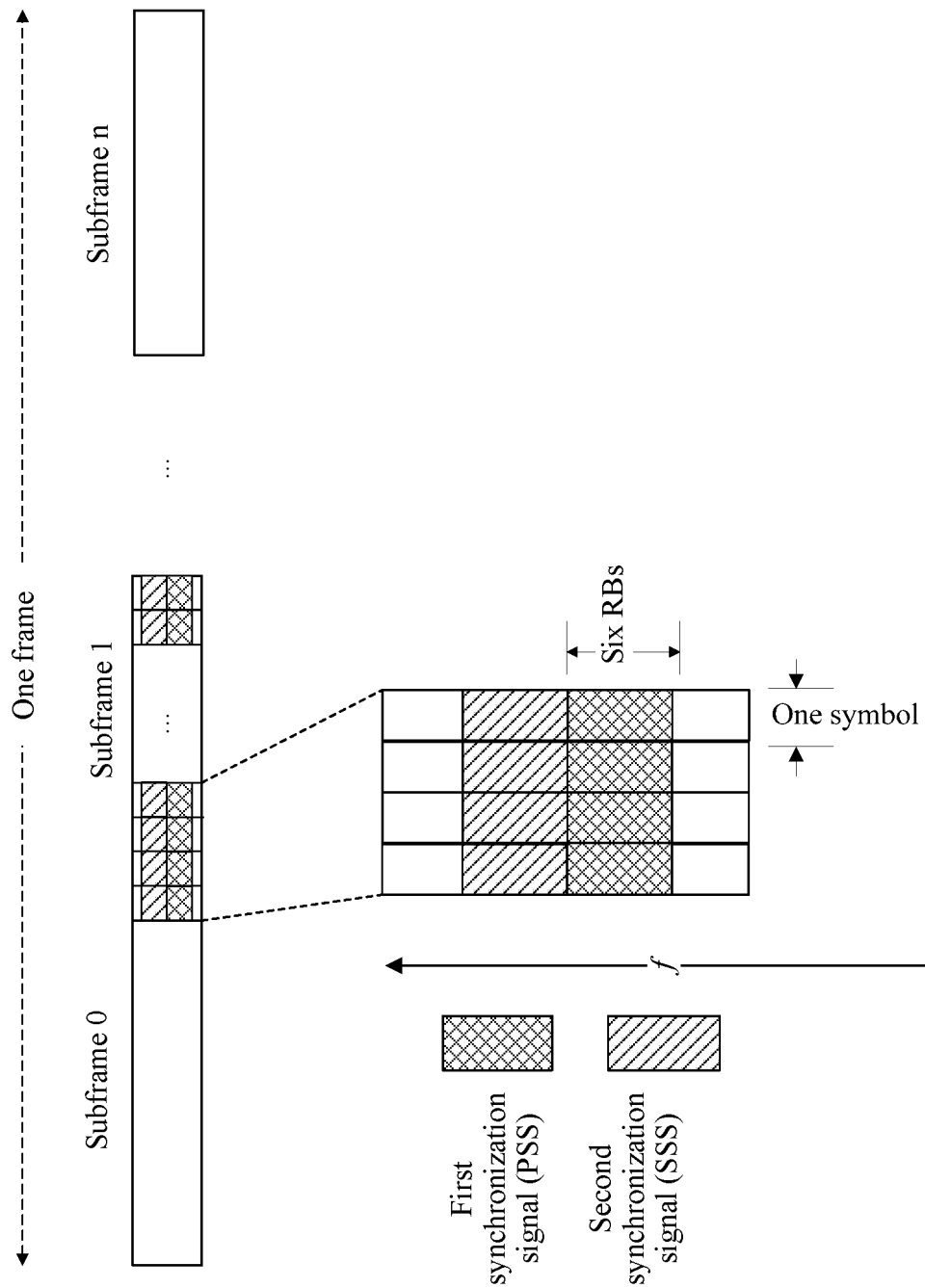
FIG. 6 is a schematic structural diagram of PSSs and SSSs of a plurality of symbols in a subframe according to Embodiment 3 of the present invention.

The following describes a downlink data sending and receiving method according to Embodiment 3 of the present invention in detail with reference to FIG. 5 and FIG. 6.

Step 501: A base station indicates position information of a first signal primary synchronization signal PSS and an SSS in time domain based on a sequence of the PSS.

In an example, the base station indicates the position information of the PSS and the SSS in time domain based on a root sequence number corresponding to the PSS sequence.

Further, the PSS and the SSS are mapped to a same symbol, for example, mapped to an OFDM symbol.

Specifically, the base station may send the PSS and the SSS by using all or some symbols in a subframe. For example, the base station sends the PSS and the SSS by using all symbols in a subframe 1, including a symbol 0 to a symbol 11. For another example, the base station sends the PSS and the SSS by using some symbols in a subframe 1, including a symbol 0 to a symbol 3 (as shown in FIG. 6). The base station may alternatively send the PSS and the SSS by using all or some symbols in a plurality of subframes.

If the base station sends the PSS and the SSS by using k symbols in a subframe, assuming that a cell ID group number is 3, there are 3 k PSS sequences. For example, when k=12, there are 36 PSS sequences in total. In the following description, it is assumed that there are 36 PSS sequences.

Root sequence numbers are in one-to-one correspondence with PSS sequences. In other words, one PSS sequence corresponds to one root sequence number, and a quantity of PSS sequences is the same as a quantity of root sequence numbers. For example, if there are 36 sequences, there are 36 root sequence numbers. Because each PSS is mapped to 62 subcarriers, each PSS sequence has 62 elements.

An example of the PSS sequence is:

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 62 \end{cases} \quad (1)$$

where n is a sequence element number, and u is a root sequence number. It can be learned from the formula (1) that each root sequence number corresponds to a PSS sequence, and each PSS sequence includes 62 elements.

When the base station sends the PSS and the SSS by using all symbols in a subframe, k=12, and the root sequence number u has 36 values in total, where the 36 root sequence numbers may be used to indicate three cell ID group numbers and 12 symbol sequence numbers. Refer to the following Table 7.

TABLE 7

| Cell ID group number | Symbol sequence number | Root sequence number $u$ |
|---|---|---|
| 0 | 0 | 0 |
| 0 | 1 | 1 |
| 0 | 2 | 2 |
| 0 | 3 | 3 |
| 0 | 4 | 4 |
| 0 | 5 | 5 |
| 0 | 6 | 6 |
| 0 | 7 | 7 |
| 0 | 8 | 8 |
| 0 | 9 | 9 |
| 0 | 10 | 10 |
| 0 | 11 | 11 |
| 1 | 0 | 12 |
| 1 | 1 | 13 |
| 1 | 2 | 14 |
| 1 | 3 | 15 |
| 1 | 4 | 16 |
| 1 | 5 | 17 |
| 1 | 6 | 18 |
| 1 | 7 | 19 |

TABLE 7-continued

| Cell ID group number | Symbol sequence number | Root sequence number $u$ |
|---|---|---|
| 1 | 8 | 20 |
| 1 | 9 | 21 |
| 1 | 10 | 22 |
| 1 | 11 | 23 |
| 2 | 0 | 24 |
| 2 | 1 | 25 |
| 2 | 2 | 26 |
| 2 | 3 | 27 |
| 2 | 4 | 28 |
| 2 | 5 | 29 |
| 2 | 6 | 30 |
| 2 | 7 | 31 |
| 2 | 8 | 32 |
| 2 | 9 | 33 |
| 2 | 10 | 34 |
| 2 | 11 | 35 |

In Table 7, the values of the root sequence number are from 0 to 35, used to indicate cell ID group numbers and symbol sequence numbers.

It should be noted that, a quantity of the values of the root sequence number u is not limited to 36. The quantity of the values is determined based on a quantity of cell ID group numbers and a sequence number of a symbol on which a synchronization signal needs to be sent. The numeric value in Table 7 is merely an example.

In addition, the root sequence number u is not limited to indicating the symbol sequence number and the cell ID group number. For example, referring to the following Table 8, the root sequence number u may indicate only the symbol sequence number. In this case, a master information block (Master Information Block, MIB for short in English) indicates a cell ID group number (described in detail hereinafter). The root sequence number u may alternatively indicate one or more of a symbol sequence number, a subframe number, a frame number, a beam number, and a beam group number. Details are not described herein.

TABLE 8

| Symbol sequence number | Root sequence number $u$ |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |

It should be noted that, the base station may indicate all cell ID group numbers (referring to Table 7) by using the root sequence number u, or may not indicate a cell ID group number (referring to Table 8), or may indicate only some cell ID group numbers. For example, the root sequence number u indicates some cell ID group numbers, and the MIB indicates other cell ID group numbers. Likewise, only the MIB may indicate cell ID group numbers, but the root sequence number u does not indicate cell ID group numbers (as shown in Table 8).

If the cell ID group numbers are indicated by using the MIB, and there are three cell ID group numbers, when the MIB is 00, it indicates that the cell ID group number is 0; when the MIB is 01, it indicates that the cell ID group number is 1; when the MIB is 10, it indicates that the cell ID group number is 2.

Further, to improve reliability of signal transmission, the base station uses a MIB pilot corresponding to a cell ID group number, and an initial value of the MIB pilot is:

$$c_{init}=2^{10} \cdot (7 \cdot (n'_s+1)+l+1) \cdot (2 \cdot N_{IDgroup}^{cell}+1)+ 2 \cdot N_{IDgroup}^{cell}+N_{CP} \quad (2)$$

where $N_{IDgroup}^{cell}$ is a cell ID group number; and $$n'_s = \begin{cases} 10\lfloor n_s/10 \rfloor + n_s \bmod 2 & \text{when a } CRS \text{ is a part of a } DRS \text{ in a frame structure type 3;} \\ n_s & \text{other} \end{cases}$$

$$N_{CP} = \begin{cases} 1 & \text{for normal } CP \\ 0 & \text{for extended } CP \end{cases}$$

where $n^s$ is a timeslot number.

The following describes how the base station indicates a physical cell identifier PCI.

The PCI is used to distinguish between different cells, and is indicated by a cell ID group number and a cell ID. It can be learned from the foregoing Table 7 that the base station may indicate the cell ID group number by using the root sequence number u and/or the master information block MIB; and the base station indicates the cell ID by using one of an SSS sequence set 1 or an SSS sequence set 2.

Step 502: A terminal receives a frame including the primary synchronization signal PSS and the secondary synchronization signal SSS, and performs blind detection on the PSS to obtain a root sequence number of the PSS sequence.

Specifically, the terminal substitutes the values 0 to 35 of the root sequence number u in Table 7 into the foregoing formula (1) separately and obtains, through calculation, a PSS sequence (including 62 elements) corresponding to each root sequence number. The terminal performs correlation detection on the PSS sequence obtained through calculation and the PSS sequence obtained through blind detection, and obtains a root sequence number corresponding to a PSS sequence having strongest correlation in the values 0 to 35 of the root sequence number u, where the root sequence number is a root sequence number of the received PSS sequence.

Step 503: The terminal obtains the position information of the PSS and the SSS in time domain by querying a table and based on the root sequence number of the PSS sequence. For example, the cell ID group number and the symbol sequence number are obtained by querying the foregoing Table 7.

It should be noted that, the base station may indicate the cell ID group number and the symbol sequence number by using the root sequence number u. The base station may alternatively indicate only the symbol sequence number by using the root sequence number u, and indicate the cell ID group number by using the PSS sequence. In this case, the terminal obtains the corresponding symbol sequence number by querying the foregoing Table 8, and determines the cell ID group number based on the PSS sequence corresponding to the root sequence number.

In addition, the base station may alternatively indicate one or more of a subframe number, a frame number, a beam number, and a beam group number by using the root sequence number u of the PSS sequence. In this case, the terminal obtains the corresponding subframe number and/or frame number and/or beam number and/or beam group number by querying a corresponding entry. Details are not described herein.

Step 504: The terminal detects the secondary synchronization signal SSS, determines a cell ID by using the SSS, and further determines a physical cell identifier PCI by using the cell ID and a cell ID group number (obtained in step 503).

Embodiment 4

In an existing communications system, for example, in an LTE system, a subcarrier spacing is fixed. However, in a future communications system, for example, in a 5G communications system, a subcarrier spacing may not be fixed. For a subcarrier spacing that is not fixed, the prior art does not resolve a problem about how a base station indicates the subcarrier spacing and how a terminal determines the subcarrier spacing. Embodiment 2 of the present invention provides a method to resolve the problem.

Figure 7:
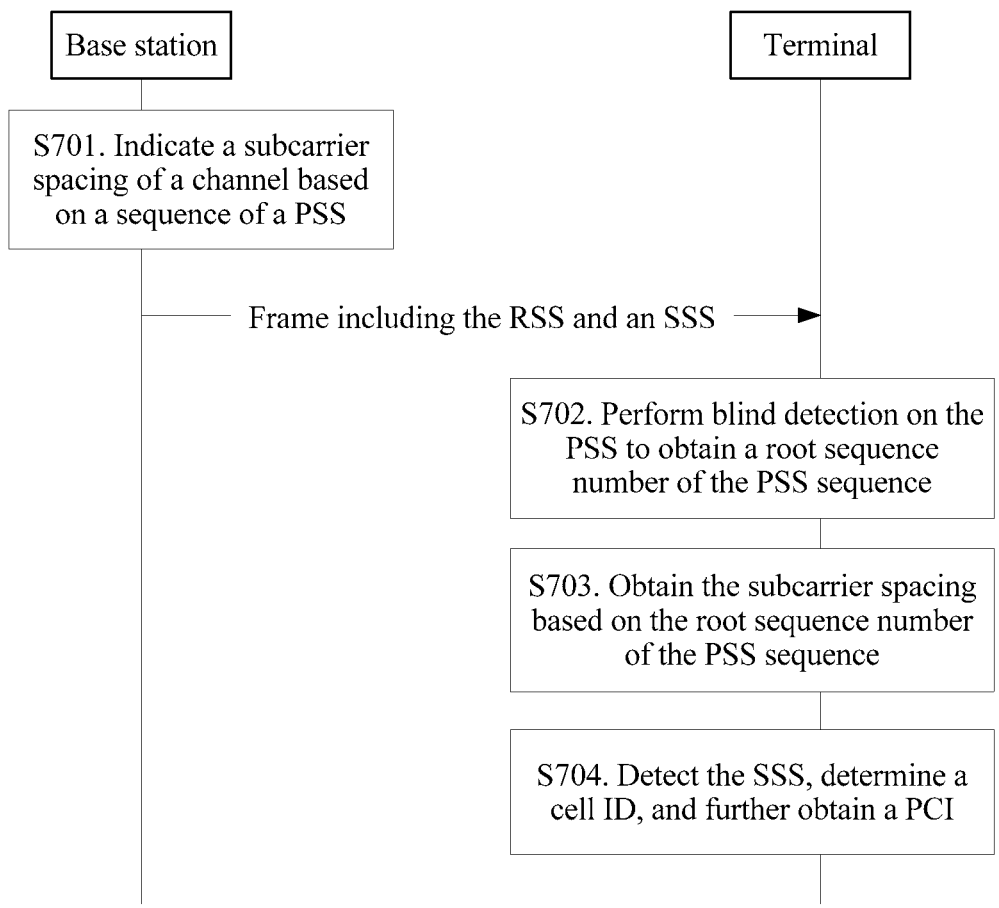
FIG. 7 is a schematic diagram of a downlink data sending and receiving method according to Embodiment 4 of the present invention.

The following describes a downlink data sending and receiving method according to Embodiment 4 of the present invention in detail with reference to FIG. 7.

Step 701: A base station indicates a subcarrier spacing of a channel based on a sequence of a first signal primary synchronization signal PSS.

In an example, the base station indicates the subcarrier spacing of the channel based on a root sequence number corresponding to the PSS sequence.

Further, the PSS and an SSS are mapped to a same symbol, and the symbol is an OFDM symbol.

Specifically, PSS sequences are in one-to-one correspondence with root sequence numbers. In other words, one PSS sequence corresponds to one root sequence number, and a quantity of PSS sequences is the same as a quantity of root sequence numbers. For example, if there are 36 sequences, there are 36 root sequence numbers. Because each PSS is mapped to 62 subcarriers, each PSS sequence has 62 elements. For details about the PSS and the relationship between the PSS and the root sequence, refer to the formula (1) and descriptions about related content.

In addition, the base station may indicate the subcarrier spacing and all cell ID group numbers based on the root sequence number u of the PSS. Alternatively, the base station may indicate the subcarrier spacing and some cell ID group numbers based on the root sequence number u of the PSS, and a master information block MIB indicates other cell ID group numbers.

It should be noted that, the base station and a terminal store a correspondence between a root sequence number u and a subcarrier spacing, or a correspondence between a root sequence number, a subcarrier spacing, and a master information block MIB by using a table.

Further, to improve reliability of signal transmission, the base station uses a MIB pilot corresponding to a cell ID group number, and an initial value of the MIB pilot is:

$$c_{init}=2^{10}\cdot(7\cdot(n'_s+1)+l+1)\cdot(2\cdot N_{IDgroup}^{cell}+1)+2\cdot N_{IDgroup}^{cell}+N_{CP} \quad (3)$$

where $N_{IDgroup}^{cell}$ is a cell ID group number; and $$n'_s = \begin{cases} 10\lfloor n_s/10 \rfloor + n_s \bmod 2 & \text{when a } CRS \text{ is a part of a } DRS \text{ in a frame structure type 3;} \\ n_s & \text{other} \end{cases}$$

$$N_{CP} = \begin{cases} 1 & \text{for normal } CP \\ 0 & \text{for extended } CP \end{cases}$$

where $N_s$ is a timeslot number.

The following describes how the base station indicates a physical cell identifier PCI.

The PCI is used to distinguish between different cells, and is indicated by a cell ID group number and a cell ID. The base station may indicate the cell ID group number by using the root sequence number u and/or the master information block MIB; and the base station indicates the cell ID by using one of an SSS sequence set 1 or an SSS sequence set 2.

Step 702: A terminal receives a frame including the primary synchronization signal PSS and a secondary synchronization signal SSS, and performs blind detection on the PSS to obtain a root sequence number of the PSS sequence.

Specifically, the terminal substitutes the values 0 to 35 of the root sequence number u in Table 7 into the foregoing formula (1) and obtains, through calculation, a PSS sequence (including 62 elements) corresponding to each root sequence number. The terminal performs correlation detection on the PSS sequence obtained through calculation and the PSS sequence obtained through blind detection, and obtains a root sequence number corresponding to a PSS sequence having strongest correlation in the values 0 to 35 of the root sequence number u, where the root sequence number is a root sequence number of the received PSS sequence.

Step 703: The terminal obtains the subcarrier spacing of the channel by querying a table and based on the root sequence number of the PSS sequence, or the terminal obtains the subcarrier spacing and a cell ID group number based on the root sequence number of the PSS sequence.

Step 704: The terminal detects the secondary synchronization signal SSS, determines a cell ID by using the SSS, and further determines a physical cell identifier PCI by using the cell ID and the cell ID group number (obtained in step 703).

Embodiment 5

Figure 8:
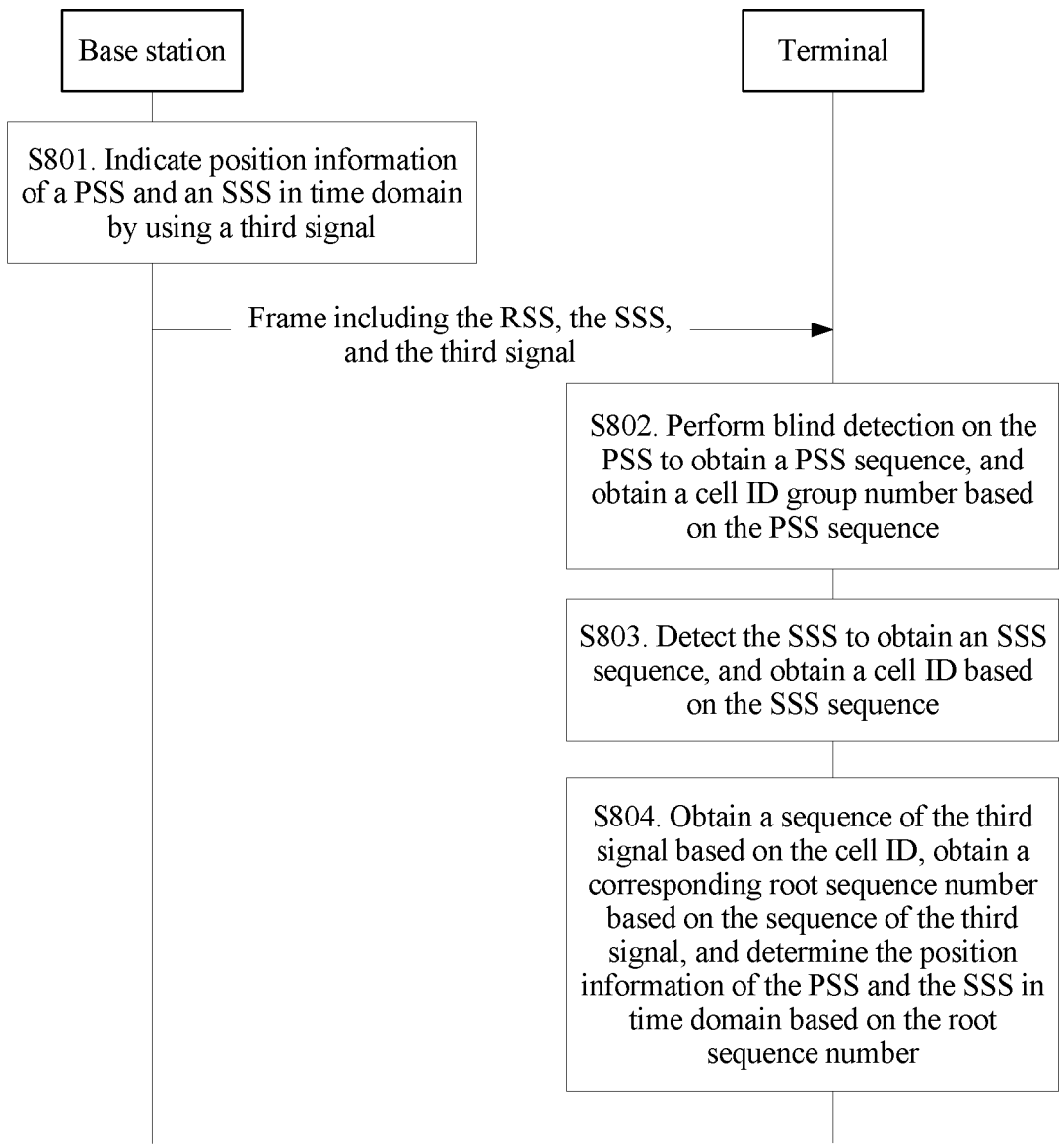
FIG. 8 is a schematic diagram of a downlink data sending and receiving method according to Embodiment 5 of the present invention.
Figure 9:
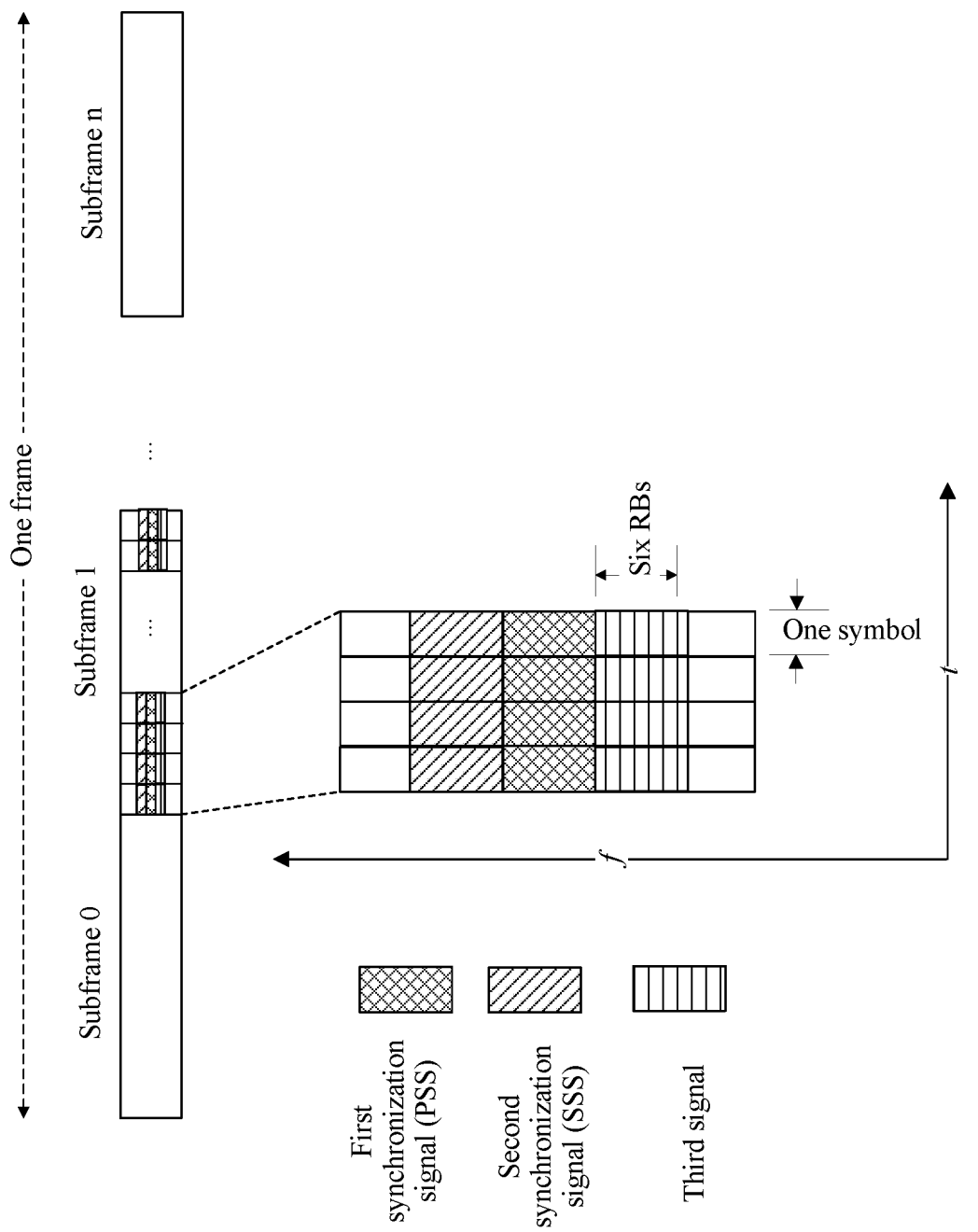
FIG. 9 is a schematic structural diagram of PSSs and SSSs of a plurality of symbols in a frame according to Embodiment 5 of the present invention.

The following describes a downlink data sending and receiving method according to Embodiment 5 of the present invention in detail with reference to FIG. 8 and FIG. 9.

Step 801: A base station indicates position information of a first signal and/or a second signal in time domain by using a third signal, where a position of the third signal is generated based on the position information of the first signal and/or the second signal in time domain.

Specifically, the base station sends a plurality of synchronization signals, including the first signal primary synchronization signal PSS, the second signal secondary synchronization signal SSS, and the third signal, where a sequence of the third signal is generated based on the position information of the first signal and the second signal in time domain and a cell ID (cell identity).

As shown in FIG. 9, the base station sends the first signal PSS, the second signal SSS, and the third signal on a plurality of symbols in a subframe, for example, a subframe 1, and the PSS, the SSS, and the third signal in each beam occupy one symbol, for example, occupy one OFDM symbol. In this case, the PSS, the SSS, and the third signal are in frequency division in frequency domain.

A primary synchronization signal PSS sequence may be a PSS sequence in LTE, and a secondary synchronization signal SSS sequence may be a first SSS sequence group or a second SSS sequence group in LTE, where the PSS sequence is used to indicate a cell ID group number and the SSS sequence is used to indicate a cell ID.

In an example, the sequence of the third signal is determined based on the position information of the first signal primary synchronization signal PSS and the second signal secondary synchronization signal SSS, and is scrambled by using the cell ID.

In another example, the sequence of the third signal is determined based on the cell ID and scrambled by using the position information of the PSS and the SSS in time domain.

The position information of the PSS and the SSS in time domain includes one or more of a symbol sequence number, a subframe number, a frame number, a beam number, and a beam group number.

The following uses an example in which the sequence of the third signal is determined based on the position information of the PSS and the SSS in time domain and scrambled by using the cell ID, to describe how to generate the sequence of the third signal.

The sequence of the third signal is:

$$d_u(n) = \begin{cases} c^{N_{ID}}(n) e^{-j\frac{\pi u n(n+1)}{f+1}} & n = 0, 1, \ldots, f-1 \\ c^{N_{ID}}(n) e^{-j\frac{\pi u (n+1)(n+2)}{f+1}} & n = f-1, f, \ldots, 2f-1 \end{cases} \quad (4)$$

where u is a root sequence number of the third signal sequence, $N_{ID}$ is a cell ID, $c^{U_{ID}}(n)$ is a scrambling sequence, and f is a half of a quantity of subcarriers occupied by the third signal; for example, if the quantity of the subcarriers occupied by the third signal is 62, f=31.

The third signal indicates that the position information of the PSS and the SSS in time domain is one or more of a symbol sequence number, a subframe number, a frame number, a beam number, and a beam group number of the PSS and the SSS, and correspondingly, a value of the root sequence number u is also one or more of the symbol sequence number, the subframe number, the frame number, the beam number, and the beam group number. For example, if the third signal indicates that the position information of the PSS and the SSS in time domain is the symbol sequence number, the value of the root sequence number u is 0 to 11.

In the formula (2), the scrambling sequence $c^{N_{ID}}(n)$ is:

$c^{N_{ID}}(n) = \tilde{c}((n+N_{ID}) \bmod f)$ $\tilde{c}(i) = 1 - 2x(i)$ $x(i+5) = (x(i+2) + x(i)) \bmod 2 \quad (5)$ where x(0)=0, x(1)=0, x(2)=0, x(3)=0, x(4)=1, and mod is a modulo function.

Step 802: A terminal receives a frame including the first signal PSS, the second signal SSS, and the third signal, performs blind detection on the first signal PSS to obtain a PSS sequence, and obtains a cell ID group number based on the PSS sequence.

Step 803: The terminal detects the second signal SSS to obtain an SSS sequence, and obtains a cell ID based on the SSS sequence.

Step 804: The terminal obtains a scrambling sequence $c^{N_{ID}}(n)$ by using the foregoing formula (3) and based on the cell ID. The terminal obtains the sequence of the third signal by using the formula (2) and based on the scrambling sequence $c^{N_{ID}}(n)$. The terminal performs correlation detection based on the sequence of the third signal, to obtain a root sequence u corresponding to a third signal sequence having strongest correlation. The terminal obtains the position information of the first signal PSS and the second signal SSS in time domain based on the root sequence u, for example, obtains symbol sequence numbers of the PSS and the SSS. Therefore, it can be learned that the position of the third signal is generated based on the position information of the first signal and/or the second signal in time domain.

To sum up, the terminal obtains the sequence of the third signal by using the formulas (2) and (3). In other words, if the base station indicates, by using the third signal, that the position information of the PSS and the SSS in time domain is the symbol sequence numbers of the PSS and the SSS, the terminal substitutes the symbol sequence numbers such as 0 to 11 into the formulas (2) and (3) to obtain 12 third signal sequences through calculation separately. The terminal performs correlation detection on the third signal sequence detected by the terminal and the 12 third signal sequences obtained through calculation, to obtain a third signal sequence having strongest correlation and a root sequence number corresponding to the third signal sequence. Root sequence numbers are in one-to-one correspondence with the position information of the PSS and the SSS in time domain. For example, the root sequence numbers are in one-to-one correspondence with the symbol sequence numbers. Therefore, if a root sequence number is obtained based on the correlation operation, a symbol sequence number corresponding to the root sequence number can be obtained, that is, the position information of the PSS and the SSS in time domain is obtained.

Embodiment 6

Figure 10:
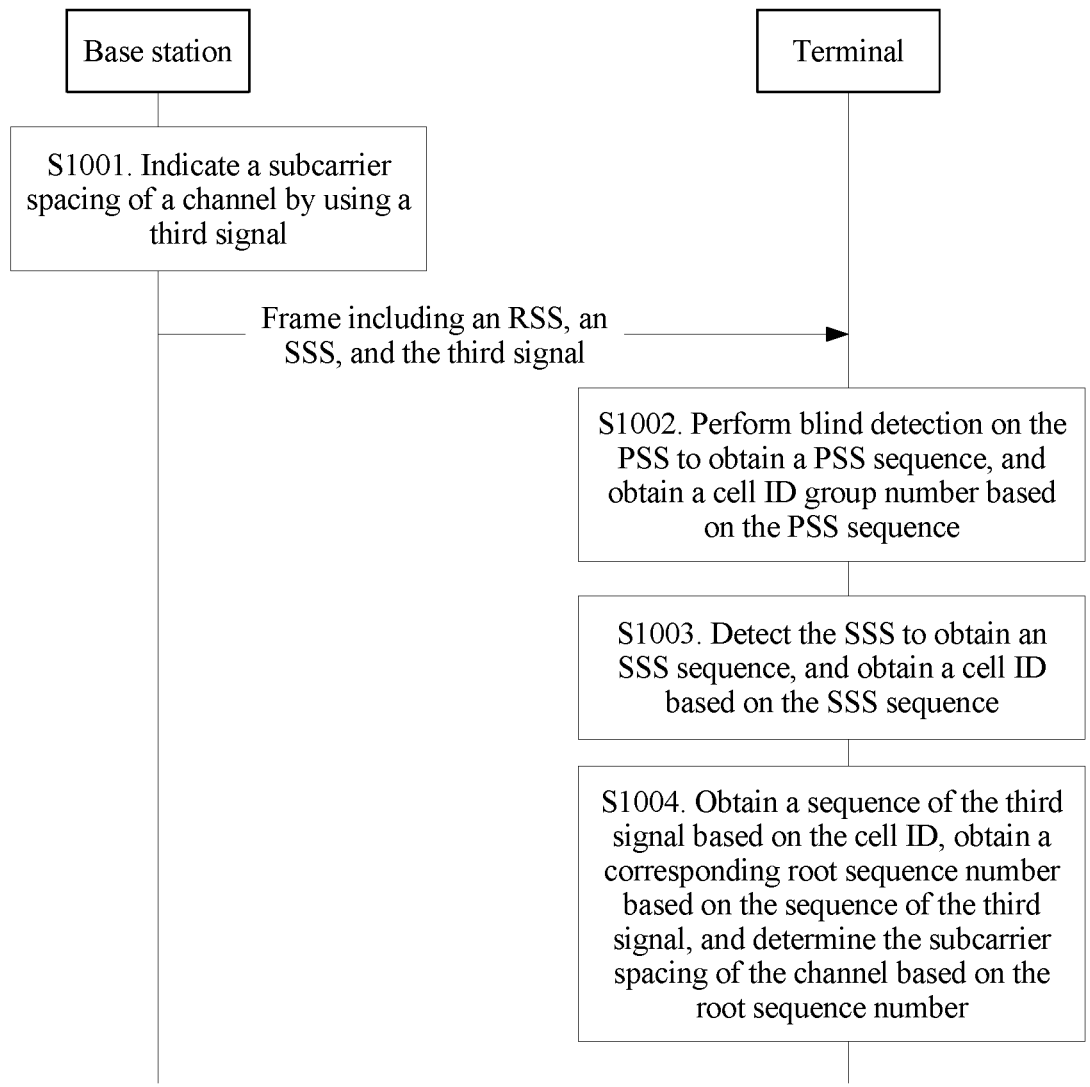
FIG. 10 is a schematic diagram of a downlink data sending and receiving method according to Embodiment 6 of the present invention.

The following describes a downlink data sending and receiving method according to Embodiment 6 of the present invention in detail with reference to FIG. 10.

Step 1001: A base station indicates a subcarrier spacing of a channel by using a third signal, where a position of the third signal is generated based on position information of a first signal and/or a second signal in time domain, and the channel includes a broadcast channel and/or a shared channel and/or a control channel.

Specifically, the base station sends a plurality of synchronization signals, including the first signal primary synchronization signal PSS, the second signal secondary synchronization signal SSS, and the third signal, where a sequence of the third signal is generated based on the position information of the first signal and the second signal in time domain and a cell ID (cell identity).

As shown in FIG. 9, the base station sends the first signal PSS, the second signal SSS, and the third signal on a plurality of symbols in a subframe, and the PSS, the SSS, and the third signal in each beam occupy one symbol, for example, occupy one OFDM symbol. In this case, the PSS, the SSS, and the third signal are in frequency division in frequency domain.

A primary synchronization signal PSS sequence may be a PSS sequence in LTE, and a secondary synchronization signal SSS sequence may be a first SSS sequence group or a second SSS sequence group in LTE, where the PSS sequence is used to indicate a cell ID group number and the SSS sequence is used to indicate a cell ID.

In an example, the sequence of the third signal is determined based on the position information of the first signal primary synchronization signal PSS and the second signal secondary synchronization signal SSS, and is scrambled by using the cell ID.

In another example, the sequence of the third signal is determined based on the cell ID and scrambled by using the position information of the PSS and the SSS in time domain.

The following uses an example in which the sequence of the third signal is determined based on the position information of the PSS and the SSS in time domain and scrambled by using the cell ID, to describe how to generate the sequence of the third signal.

For the sequence of the third signal, refer to the foregoing formulas (2) and (3) and descriptions about related content.

Step 1002: A terminal receives a frame including the first signal PSS, the second signal SSS, and the third signal, performs blind detection on the first signal PSS to obtain a PSS sequence, and obtains a cell ID group number based on the PSS sequence.

Step 1003: The terminal detects the second signal SSS to obtain an SSS sequence, and obtains a cell ID based on the SSS sequence.

Step 1004: The terminal obtains a scrambling sequence $c^{N_{ID}}(n)$ by using the foregoing formula (3) and based on the cell ID. The terminal obtains the sequence of the third signal by using the formula (2) and based on the scrambling sequence $c^{N_{ID}}(n)$. The terminal performs correlation detection based on the sequence of the third signal, to obtain a root sequence u corresponding to a third signal sequence having strongest correlation. The terminal obtains the subcarrier spacing of the channel based on the root sequence u. Therefore, it can be learned that the position of the third signal is generated based on the position information of the first signal and/or the second signal in time domain.

The following continues to describe a transmit end device and a receive end device according to embodiments of the present invention.

Figure 11:
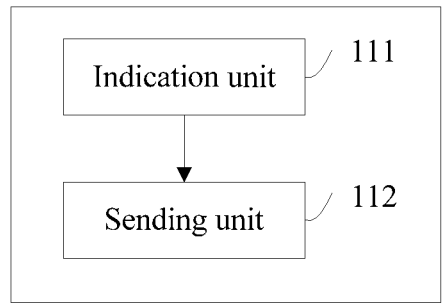
FIG. 11 is a first schematic diagram of a transmit end device according to an embodiment of the present invention.

FIG. 11 is a first schematic diagram of a transmit end device according to an embodiment of the present invention. The transmit end device includes an indication unit 111 and a sending unit 112.

The indication unit 111 is configured to indicate position information of a first signal and/or a second signal in time domain based on a position relationship between the first signal and the second signal in frequency domain and/or time domain.

The sending unit 112 is configured to send a frame including the first signal and the second signal.

In an example, the position relationship between the first signal and the second signal in frequency domain and/or time domain is specifically: a relative position relationship between the first signal and the second signal in frequency domain and/or time domain.

In an example, the indication unit 111 is further configured to indicate the position information of the first signal and/or the second signal in time domain based on a frequency difference or a subcarrier sequence number difference between a subcarrier occupied by the second signal and a corresponding subcarrier occupied by the first signal.

In an example, the indication unit 111 is further configured to indicate the position information of the first signal and/or the second signal in time domain based on a time difference or a symbol sequence number difference between a symbol occupied by the second signal and a symbol occupied by the first signal.

In an example, the indication unit 111 is further configured to indicate the position information of the first signal and/or the second signal in time domain based on a frequency difference or a resource block sequence number difference between a resource block occupied by the second signal and a corresponding resource block occupied by the first signal.

In an example, the indication unit 111 is further configured to indicate the position information of the first signal and/or the second signal in time domain based on a time difference or a resource block sequence number difference between a resource block occupied by the second signal and a corresponding resource block occupied by the first signal.

In an example, the position information of the first signal and/or the second signal in time domain is specifically: one or more of a symbol sequence number, a subframe number, a frame number, a beam number, and a beam group number of the first signal and/or the second signal.

Figure 12:
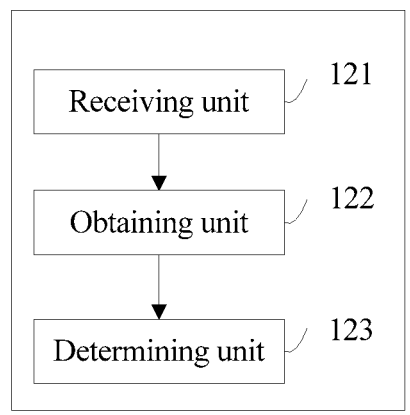
FIG. 12 is a first schematic diagram of a receive end device according to an embodiment of the present invention.

FIG. 12 is a first schematic diagram of a receive end device according to an embodiment of the present invention. The receive end device includes a receiving unit 121, an obtaining unit 122, and a determining unit 123.

The receiving unit 121 is configured to receive a frame including a first signal and a second signal.

The obtaining unit 121 is configured to obtain a position relationship between the first signal and the second signal in frequency domain and/or time domain.

The determining unit 123 is configured to determine position information of the first signal and/or the second signal in time domain based on the position relationship between the first signal and the second signal in frequency domain and/or time domain.

In an example, the obtaining a position relationship between the first signal and the second signal in frequency domain and/or time domain is specifically: obtaining a relative position relationship between the first signal and the second signal in frequency domain and/or time domain.

In an example, the determining unit 123 is specifically configured to determine the position information of the first signal and/or the second signal in time domain based on a frequency difference or a subcarrier sequence number difference between a subcarrier occupied by the second signal and a subcarrier occupied by the first signal.

In an example, the determining unit 123 is specifically configured to determine the position information of the first signal and/or the second signal in time domain based on a time difference or a symbol sequence number difference between a symbol occupied by the second signal and a symbol occupied by the first signal.

In an example, the determining unit 123 is specifically configured to indicate the position information of the first signal and/or the second signal in time domain based on a frequency difference or a resource block sequence number difference between a resource block occupied by the second signal and a corresponding resource block occupied by the first signal.

In an example, the determining unit 123 is specifically configured to determine the position information of the first signal and/or the second signal in time domain based on a time difference or a resource block sequence number difference between a resource block occupied by the second signal and a corresponding resource block occupied by the first signal.

In an example, the position information of the first signal and/or the second signal in time domain is specifically: one or more of a symbol sequence number, a subframe number, a frame number, a beam number, and a beam group number of the first signal and/or the second signal.

Figure 13:
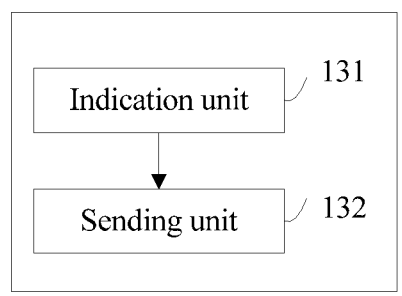
FIG. 13 is a second schematic diagram of a transmit end device according to an embodiment of the present invention.

FIG. 13 is a second schematic diagram of a transmit end device according to an embodiment of the present invention. The transmit end device includes an indication unit 131 and a sending unit 132.

The indication unit 131 is configured to indicate a subcarrier spacing of a channel based on a position relationship between a first signal and a second signal in frequency domain and/or time domain.

The sending unit 132 is configured to send a frame including the first signal, the second signal, and the channel.

The channel includes a broadcast channel and/or a shared channel and/or a control channel.

In an example, the position relationship between the first signal and the second signal in frequency domain and/or time domain is specifically: a relative position relationship between the first signal and the second signal in frequency domain and/or time domain.

In an example, the indication unit 131 is specifically configured to indicate the subcarrier spacing of the channel based on a frequency difference or a subcarrier sequence number difference between a subcarrier occupied by the second signal and a corresponding subcarrier occupied by the first signal.

In an example, the indication unit 131 is specifically configured to indicate the subcarrier spacing of the channel based on a time difference or a symbol sequence number difference between a symbol occupied by the second signal and a symbol occupied by the first signal.

In an example, the indication unit 131 is specifically configured to indicate the subcarrier spacing of the channel based on a frequency difference or a resource block sequence number difference between a resource block occupied by the second signal and a corresponding resource block occupied by the first signal.

In an example, the indication unit 131 is specifically configured to indicate the subcarrier spacing of the channel based on a time difference or a resource block sequence number difference between a resource block occupied by the second signal and a corresponding resource block occupied by the first signal.

Figure 14:
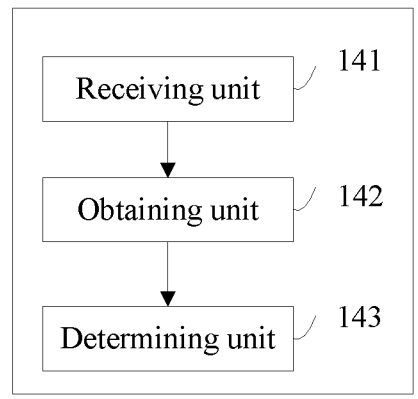
FIG. 14 is a second schematic diagram of a receive end device according to an embodiment of the present invention.

FIG. 14 is a second schematic diagram of a receive end device according to an embodiment of the present invention. The receive end device includes a receiving unit 141, an obtaining unit 142, and a determining unit 143.

The receiving unit 141 is configured to receive a frame including a first signal and a second signal.

The obtaining unit 142 is configured to obtain a position relationship between the first signal and the second signal in frequency domain and/or time domain.

The determining unit 143 is configured to determine a subcarrier spacing of a channel based on the position relationship between the first signal and the second signal in frequency domain and/or time domain.

The channel includes a broadcast channel and/or a shared channel and/or a control channel.

In an example, the determining unit 143 is specifically configured to determine the subcarrier spacing of the channel based on a relative position relationship between the first signal and the second signal in frequency domain and/or time domain.

In an example, the determining unit 143 is specifically configured to determine the subcarrier spacing of the channel based on a frequency difference or a subcarrier sequence number difference between a subcarrier occupied by the second signal and a subcarrier occupied by the first signal.

In an example, the determining unit 143 is specifically configured to determine the subcarrier spacing of the channel based on a time difference or a symbol sequence number difference between a symbol occupied by the second signal and a symbol occupied by the first signal.

In an example, the determining unit 143 is specifically configured to determine the subcarrier spacing of the channel based on a frequency difference or a resource block sequence number difference between a resource block occupied by the second signal and a corresponding resource block occupied by the first signal.

In an example, the determining unit 143 is specifically configured to determine the subcarrier spacing of the channel based on a time difference or a resource block sequence number difference between a resource block occupied by the second signal and a corresponding resource block occupied by the first signal.

Figure 15:
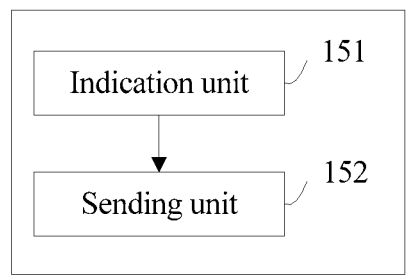
FIG. 15 is a third schematic diagram of a transmit end device according to an embodiment of the present invention.

FIG. 15 is a third schematic diagram of a transmit end device according to an embodiment of the present invention. The transmit end device includes an indication unit 151 and a sending unit 152.

The indication unit 151 is configured to indicate position information of a first signal and/or a second signal in time domain based on a sequence of the first signal.

The sending unit 152 is configured to send a frame including the first signal and the second signal.

In an example, the indication unit 151 is specifically configured to indicate the position information of the first signal and/or the second signal in time domain based on a root sequence of the sequence of the first signal.

In an example, the position information of the first signal and/or the second signal in time domain is specifically: one or more of a symbol sequence number, a subframe number, a frame number, a beam number, and a beam group number of the first signal and/or the second signal.

In an example, a value of the root sequence number is correspondingly determined based on one or more of a symbol sequence number, a subframe number, a frame number, a beam number, a beam group number, and a cell identity group number of the first signal and/or the second signal.

Figure 16:
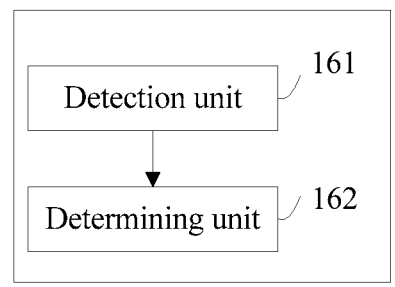
FIG. 16 is a third schematic diagram of a receive end device according to an embodiment of the present invention.

FIG. 16 is a third schematic diagram of a receive end device according to an embodiment of the present invention. The receive end device includes a detection unit 161 and a determining unit 162.

The detection unit 161 is configured to detect a first signal to obtain a sequence of the first signal.

The determining unit 162 is configured to determine position information of the first signal and/or a second signal in time domain based on the sequence of the first signal.

In an example, the detection unit 161 is specifically configured to detect the first signal to obtain a root sequence number of the sequence of the first signal; and the determining unit 162 is specifically configured to determine the position information of the first signal and/or the second signal in time domain based on the root sequence number of the sequence of the first signal.

In an example, the detection unit 161 is specifically configured to detect the first signal to obtain the sequence of the first signal, and perform correlation detection on the first signal sequence obtained through detection and a first signal sequence obtained through calculation based on the root sequence number and a formula for generating a sequence of the first signal, to obtain a first signal having strongest correlation and a root sequence number corresponding to the first signal.

Figure 17:
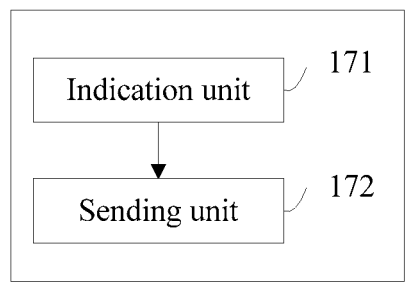
FIG. 17 is a fourth schematic diagram of a transmit end device according to an embodiment of the present invention.

FIG. 17 is a fourth schematic diagram of a transmit end device according to an embodiment of the present invention. The transmit end device includes an indication unit 171 and a sending unit 172.

The indication unit 171 is configured to indicate a subcarrier spacing of a channel based on a sequence of a first signal.

The sending unit 172 is configured to send a frame including the first signal, a second signal, and the channel. The channel includes a broadcast channel and/or a shared channel and/or a control channel.

In an example, the indication unit 171 is specifically configured to indicate the subcarrier spacing of the channel based on a root sequence number of the sequence of the first signal.

Figure 18:
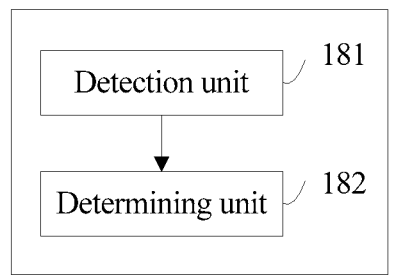
FIG. 18 is a fourth schematic diagram of a receive end device according to an embodiment of the present invention.

FIG. 18 is a fourth schematic diagram of a receive end device according to an embodiment of the present invention. The receive end device includes a detection unit 181 and a determining unit 182.

The detection unit 181 is configured to detect a first signal to obtain a sequence of the first signal.

The determining unit 182 is configured to determine a subcarrier spacing of a channel based on the sequence of the first signal.

The channel includes a broadcast channel and/or a shared channel and/or a control channel.

In an example, the detection unit 181 is specifically configured to determine the subcarrier spacing of the channel based on a root sequence number of the sequence of the first signal.

In an example, the detection unit 181 is further configured to detect the first signal to obtain the sequence of the first signal, and perform correlation detection on the first signal sequence obtained through detection and a first signal sequence obtained through calculation based on the root sequence number and a formula for generating a sequence of the first signal, to obtain a first signal having strongest correlation and a root sequence number corresponding to the first signal.

Figure 19:
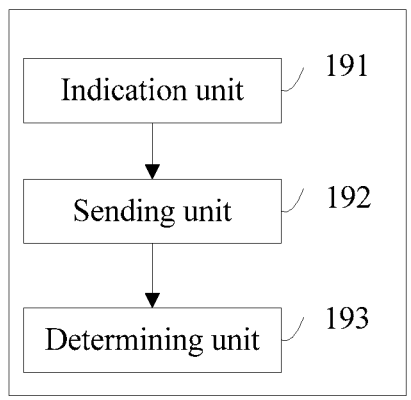
FIG. 19 is a fifth schematic diagram of a transmit end device according to an embodiment of the present invention.

FIG. 19 is a fifth schematic diagram of a transmit end device according to an embodiment of the present invention. The transmit end device includes an indication unit 191, a sending unit 192, and a determining unit 193.

The indication unit 191 is configured to indicate position information of a first signal and/or a second signal in time domain by using a third signal, where a position of the third signal is generated based on the position information of the first signal and/or the second signal in time domain.

The sending unit 192 is configured to send a frame including the first signal, the second signal, and the third signal.

In an example, the determining unit 193 is configured to determine a sequence of the third signal based on the position information of the first signal and/or the second signal in time domain, and perform scrambling by using the cell identity.

In an example, the determining unit 193 is configured to determine a sequence of the third signal based on the cell identity, and perform scrambling by using the position information of the first signal and/or the second signal in time domain.

In an example, the position information of the first signal and/or the second signal in time domain is specifically: one or more of a symbol sequence number, a subframe number, a frame number, a beam number, and a beam group number of the first signal and/or the second signal.

Figure 20:
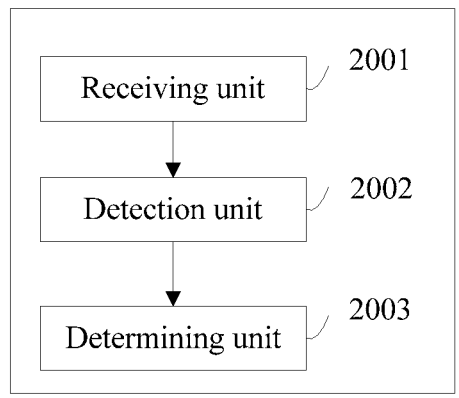
FIG. 20 is a fifth schematic diagram of a receive end device according to an embodiment of the present invention.

FIG. 20 is a fifth schematic diagram of a receive end device according to an embodiment of the present invention. The receive end device includes a receiving unit 2001, a detection unit 2002, and a determining unit 2003.

The receiving unit 2001 is configured to receive a frame including a first signal, a second signal, and a third signal.

The detection unit 2002 is configured to detect a sequence of the third signal, where a position of the third signal is generated based on position information of the first signal and/or the second signal in time domain.

The determining unit 2003 is configured to determine the position information of the first signal and/or the second signal in time domain based on the sequence of the third signal.

In an example, the detection unit 2002 is specifically configured to detect the first signal and/or the second signal to obtain the cell identity; and the determining unit is specifically configured to obtain a scrambling sequence based on the cell identity, detect the third signal based on the scrambling sequence to obtain the sequence of the third signal, and determine the position information of the first signal and/or the second signal in time domain based on the sequence of the third signal.

In an example, the detection unit 2002 is further configured to detect the sequence of the third signal to obtain the sequence of the third signal; and the determining unit is further configured to determine the position information of the first signal and/or the second signal in time domain based on a root sequence number of the sequence of the third signal.

In an example, the position information of the first signal and/or the second signal in time domain is specifically: one or more of a symbol sequence number, a subframe number, a frame number, a beam number, and a beam group number of the first signal and/or the second signal.

Figure 21:
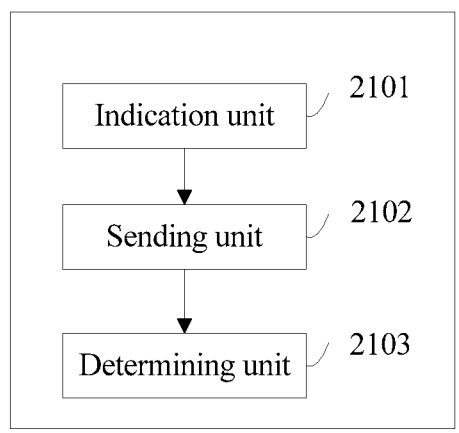
FIG. 21 is a sixth schematic diagram of a transmit end device according to an embodiment of the present invention.

FIG. 21 is a sixth schematic diagram of a transmit end device according to an embodiment of the present invention. The transmit end device includes an indication unit 2101, a sending unit 2102, and a determining unit 2103.

The indication unit 2101 is configured to indicate a subcarrier spacing of a channel by using a third signal, where a position of the third signal is generated based on position information of the first signal and/or a second signal in time domain.

The sending unit 2102 is configured to send a frame including the third signal and the channel.

The channel includes a broadcast channel and/or a shared channel and/or a control channel.

In an example, the determining unit 2103 is configured to determine a sequence of the third signal based on the position information of the first signal and/or the second signal in time domain, and perform scrambling by using a cell identity.

In an example, the determining unit 2103 is configured to determine a sequence of the third signal based on a cell identity, and perform scrambling by using the position information of the first signal and/or the second signal in time domain.

Figure 22:
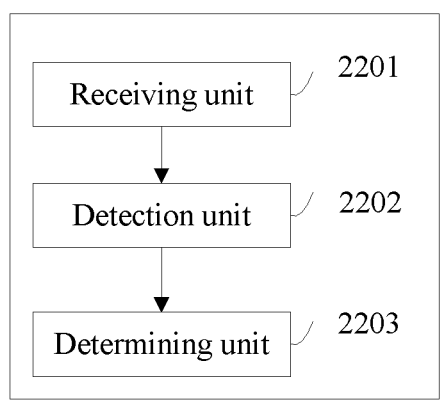
FIG. 22 is a sixth schematic diagram of a receive end device according to an embodiment of the present invention.

FIG. 22 is a sixth schematic diagram of a receive end device according to an embodiment of the present invention. The receive end device includes a receiving unit 2201, a detection unit 2202, and a determining unit 2203.

The receiving unit 2201 is configured to receive a frame including a first signal, a second signal, and a third signal.

The detection unit 2202 is configured to detect a sequence of the third signal, where a position of the third signal is generated based on position information of the first signal and/or the second signal in time domain.

The determining unit 2203 is configured to determine a subcarrier spacing of a channel based on the sequence of the third signal.

The channel includes a broadcast channel and/or a shared channel and/or a control channel.

In an example, the detection unit 2202 is further configured to detect the first signal and/or the second signal to obtain the cell identity; and the determining unit 2203 is further configured to obtain a scrambling sequence based on the cell identity, detect the third signal based on the scrambling sequence to obtain the sequence of the third signal, and determine the subcarrier spacing of the channel based on the sequence of the third signal.

In an example, the determining unit 2203 is further configured to detect the sequence of the third signal to obtain the sequence of the third signal, and determine the subcarrier spacing of the channel based on a root sequence number of the sequence of the third signal.

A person skilled in the art may understand that method or algorithm steps described with reference to content disclosed in the present invention may be implemented by hardware, or may be implemented by a processor by executing a software instruction. Details are not described herein.

The objectives, technical solutions, and beneficial effects of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made within the spirit and principle of the present invention shall fall within the protection scope of the present invention.

What is claimed is:

1. A downlink signal sending method, wherein the method comprises:
    indicating, by a transmit end device, position information of at least one of a first signal or a second signal in time domain based on a position relationship between the first signal and the second signal in at least one of frequency domain or time domain, wherein indicating the position information comprises:
        indicating, by the transmit end device, the position information of the at least one of the first signal or the second signal in time domain based on:
            a frequency difference or a subcarrier sequence number difference between a subcarrier occupied by the second signal and a corresponding subcarrier occupied by the first signal; or
            a frequency difference or a resource block sequence number difference between a resource block occupied by the second signal and a corresponding resource block occupied by the first signal; and
    sending a frame comprising the first signal and the second signal, wherein the first signal and the second signal are sent on each symbol of a plurality of symbols in a subframe of the frame.

2. The method according to claim 1, wherein the position relationship between the first signal and the second signal in at least one of frequency domain or time domain comprises a relative position relationship between the first signal and the second signal in the at least one frequency domain or time domain.

3. A transmit end device, comprising:
    at least one processor, the at least one processor configured to indicate position information of at least one of a first signal or a second signal in time domain based on:
        a frequency difference or a subcarrier sequence number difference between a subcarrier occupied by the second signal and a corresponding subcarrier occupied by the first signal; or
        a frequency difference or a resource block sequence number difference between a resource block occupied by the second signal and a corresponding resource block occupied by the first signal; and
    a transmitter, the transmitter configured to send a frame comprising the first signal and the second signal, wherein the first signal and the second signal are sent on each symbol of a plurality of symbols in a subframe of the frame.

4. A receive end device, comprising:
    a receiver, the receiver configured to receive a frame comprising a first signal and a second signal, wherein the first signal and the second signal are received on each symbol of a plurality of symbols in a subframe of the frame; and
    at least one processor, the at least one processor configured to:
        obtain a position relationship between the first signal and the second signal in at least one of a frequency domain or time domain; and
        determine position information of at least one of the first signal or the second signal in time domain based on:
            a frequency difference or a subcarrier sequence number difference between a subcarrier occupied by the second signal and a corresponding subcarrier occupied by the first signal; or
            a frequency difference or a resource block sequence number difference between a resource block occupied by the second signal and a corresponding resource block occupied by the first signal.

* * * * *